(12) United States Patent
Smith et al.

(10) Patent No.: US 11,216,769 B2
(45) Date of Patent: Jan. 4, 2022

(54) METHOD AND SYSTEM FOR THE PROVISION OF A MODEL UTILIZING CAUSAL RELATIONSHIP DISCOVERY AND ANALYSIS

(71) Applicant: Mood Enterprises Limited, York (GB)

(72) Inventors: Simon Smith, York (GB); Simon Hodgson, York (GB); Mark Balmer, York (GB)

(73) Assignee: Mood Enterprises Limited, York (GB)

( * ) Notice: Subject to any disclaimer, the term of this patent is extended or adjusted under 35 U.S.C. 154(b) by 372 days.

(21) Appl. No.: 15/767,840

(22) PCT Filed: Oct. 14, 2016

(86) PCT No.: PCT/GB2016/053187
§ 371 (c)(1),
(2) Date: Apr. 12, 2018

(87) PCT Pub. No.: WO2017/064501
PCT Pub. Date: Apr. 20, 2017

(65) Prior Publication Data
US 2018/0300658 A1   Oct. 18, 2018

(30) Foreign Application Priority Data
Oct. 14, 2015   (GB) ...................................... 1518176

(51) Int. Cl.
*G06Q 10/06*   (2012.01)
*G06F 16/248*   (2019.01)
(Continued)

(52) U.S. Cl.
CPC ....... *G06Q 10/067* (2013.01); *G06F 3/04842* (2013.01); *G06F 16/248* (2019.01); *G06F 16/284* (2019.01); *G06Q 10/063* (2013.01)

(58) Field of Classification Search
CPC .. G06F 3/04842; G06F 16/248; G06F 16/284; G06Q 10/063; G06Q 10/067
(Continued)

(56) References Cited

U.S. PATENT DOCUMENTS 5,249,260 A  *  9/1993  Nigawara ................ G06N 5/02
                                                         706/45
6,954,757 B2 * 10/2005  Zargham ................ G06Q 10/06
(Continued)

*Primary Examiner* — Andrew Joseph Rudy
(74) *Attorney, Agent, or Firm* — Gable Gotwals

(57) ABSTRACT

This invention relates to a method for creating and using a dynamically-generated model with a visual display of the model. The model has first and second layers relevant to the organization for which the model is generated. Different projects within the organization can be represented and explored by the user, each project having a plurality of features represented by elements and one or more sub-elements, with the first layer including one or more elements and one or more sub-elements connected by one or more links indicating a relationship between two or more of the elements and/or sub-elements, and at least one element and/or sub-element includes one or more attributes associated therewith and the second layer includes the one or more elements and/or sub-elements connected by the one or more links and further includes links to one or more factors or components that influence one or more linked elements, sub-elements and/or attributes.

20 Claims, 22 Drawing Sheets

(51) Int. Cl.
*G06F 16/28* (2019.01)
*G06F 3/0484* (2013.01)

(58) Field of Classification Search
USPC .......................... 709/217, 223–229; 705/348
See application file for complete search history.

(56) References Cited

U.S. PATENT DOCUMENTS

| | | | | |
|---|---|---|---|---|
| 6,963,916 | B1* | 11/2005 | Pugaczewski | H04L 41/0806 709/218 |
| 7,120,874 | B2* | 10/2006 | Shah | G06F 8/34 715/733 |
| 7,162,534 | B2* | 1/2007 | Schleiss | G05B 19/4185 709/232 |
| 7,609,652 | B2* | 10/2009 | Kellerer | H04L 29/06 370/252 |
| 7,617,167 | B2* | 11/2009 | Griffis | G06Q 10/06 706/45 |
| 7,689,651 | B2* | 3/2010 | Ye | G06Q 50/12 709/204 |
| 8,027,859 | B2* | 9/2011 | Pulfer | G06Q 10/06375 705/7.22 |
| 8,554,586 | B2* | 10/2013 | Barth | G06Q 10/06313 705/4 |
| 8,583,779 | B2* | 11/2013 | Meir | H04L 12/66 709/224 |
| 8,600,726 | B1* | 12/2013 | Varshney | G06F 9/455 703/26 |
| 8,700,781 | B2* | 4/2014 | Sawyer | H04L 51/14 709/227 |
| 8,868,725 | B2* | 10/2014 | Samba | H04L 41/06 709/224 |
| 10,067,655 | B2* | 9/2018 | Hamilton | G06Q 10/06 |
| 10,289,967 | B2* | 5/2019 | Stephan | G06Q 10/063 |
| 2003/0014500 | A1 | 1/2003 | Schleiss | |
| 2004/0098479 | A1* | 5/2004 | Bennett | H04L 43/0852 709/224 |
| 2007/0090180 | A1 | 4/2007 | Griffis | |
| 2010/0082380 | A1* | 4/2010 | Merrifield, Jr. | G06Q 10/063 705/348 |
| 2011/0137877 | A1* | 6/2011 | Strassner | G06Q 10/00 707/694 |
| 2013/0096980 | A1 | 4/2013 | Basavapatna et al. | |
| 2014/0108086 | A1 | 4/2014 | Prieto | |
| 2015/0229571 | A1* | 8/2015 | Zhang | H04L 1/0002 709/224 |
| 2016/0063070 | A1* | 3/2016 | Benum | G06F 16/2272 707/722 |

\* cited by examiner

METHOD AND SYSTEM FOR THE PROVISION OF A MODEL UTILIZING CAUSAL RELATIONSHIP DISCOVERY AND ANALYSIS

CROSS-REFERENCE TO RELATED APPLICATIONS

This application is the United States National Phase of Patent Application No. PCT/GB2016/053187 filed 14 Oct. 2016, which claims priority to British Patent Application No. 1518176.1 filed 14 Oct. 2015, each of which are incorporated herein by reference.

BACKGROUND OF THE INVENTION

The present invention relates to the creation of a method and system for exploring and evaluating the causal relationship between various elements within an organisation such as a commercial business and/or business model. Although the following description refers to the generation of a method and system in use in an organisation context, the person skilled in the art will appreciate that the present invention can be applied to other enterprises, projects and/or processes, and/or the like.

The visualisation of the links between elements and sub-elements within an enterprise, and in particular a business structure, by the provision of a diagrammatic model, is known. A particular problem with present enterprise and business model visualisation techniques is that, although the interdependence or influence of certain elements or sub-elements on other linked elements or sub-elements can be shown diagrammatically, the discovery or which factors within an element and/or sub-element have a causal effect, and to what degree, has not been realised.

Furthermore, current methods and systems do not provide for representation of the degree of influence nor ability to analyse or simulate the amount of influence a business factor has on causally linked elements and/or sub-elements.

This can therefore mean that many problems are experienced by the managers of organisations, such as the rate of change of the organisation is unable to keep up with the increasing pace of change in or around the organisation, the organisation operations are increasingly complex, and the use of data for understanding what's going on is increasingly expensive and ineffectual and/or management is increasingly committed to outcomes, but without a strong enough basis for evidencing achievement.

It is therefore an aim of the current invention to provide a method and system which addresses the abovementioned problems.

According to a first aspect of the invention there is provided a method of creating a model for an organisation and relating to a plurality of projects performed by the organisation, each project having a plurality of features represented by elements and one or more sub-elements, said model including a first model layer and at least a second model layer;

said first model layer including one or more elements and one or more sub-elements whereby said elements and/or sub-elements are connected by one or more links indicating a relationship between two or more of said elements and/or sub-elements, and at least one element and/or sub-element includes one or more attributes associated therewith, wherein the at least second model layer includes said one or more elements and/or sub-elements connected by said one or more links and further includes links to one or more factors or components that influence one or more linked elements, sub-elements and/or attributes.

In one embodiment the relationship indicated by a link is a causal relationship.

In one embodiment the influence on the one or more linked elements is a direct influence.

In one embodiment said factors or components are displayed adjacent to, overlaid and/or superimposed on, at least one of said elements and/or sub-elements that contain the attribute and/or are linked to the same.

Typically the degree of influence a factor or component has on one or more elements, sub-elements and/or attributes is represented and/or quantified.

Preferably the degree of influence of one of more factors of components has on linked elements, sub-element and/or attributes of the same is represented by any one or any combination of circles, arcs, dials, bars, segments and/or the like.

In one embodiment the user can amend, adjust and/or insert a degree of influence that a factor or component has, over linked elements, sub-elements and/or attributes. Typically the user can input their own values to explore the degree of influence a factor or component has over an element, sub-element and/or attribute. This is particularly useful when a plurality of factors or components have a causal effect on an element, sub-element or attribute.

In a preferred embodiment the at least second model layer includes representations of one or more factors or components that directly influence one or more further factors or components of said one or more further elements or sub-elements connected by said causal links.

Typically when selecting or moving from the first model layer to at least the second model layer, at least part of the elements, sub-elements, and/or links visible in the first layer are visible in the second or further model layers. Further typically the elements, sub-elements and/or links from the first model layer are visible along with the factors or components which form part of the second model layer.

In a preferred embodiment the factors or components are displayed substantially within the elements and/or sub-elements in at least the second model layer. Typically the attributes are displayed in a separate window and/or region of a display. Further typically the attributes are displayed on user selection of an element and/or sub-element in at least the first model layer.

In one embodiment the factors or components that have a causal influence on one or more further factors or components are colour coded. Typically a factor or component that has a causal effect and/or direct influence on one or more other factors or components are the same colour and/or the shades of the same colour.

In one embodiment the factors and/or components are shown as coloured rings or circles and/or segments thereof. Typically the size of the segment is indicative of the probability of a factor or component being in a particular state and/or condition.

Typically the attributes include data and/or representations of said data that concerns the past and/or present performance of an element and/or sub-element. Further typically the attributes display data in the form or tables, graphs and/or the like.

In one embodiment the attribute data is stored in one or more databases. Typically said data is recalled from said databases in response to user selection and/or query.

Typically reference to data from one or more databases will affect the elements and/or sub-elements of the first layer and, in turn the information provided in the second layer.

In one embodiment the user can switch between the first and at least second model layers. Typically, when switching from a second model layer to first model layer, wherein the factors or components for one or more elements and/or sub-elements are displayed in said second model layer, the elements, sub-elements and/or links relevant in the second model layer are displayed and/or highlighted in the first model layer. Thus, various scenarios can be explored by adjusting one or more factors or components viewable in the second model layer, wherein the relevant model elements, sub-elements and/or causal links between the same are displayed to the user when reverting back to, or otherwise subsequently viewing the first model layer. The user can then identify the elements which require attention and/or action in order to implement one or more of the various scenarios.

In one embodiment the data populating the elements, sub-elements and/or links between the same in one or more layers is provided in one or more databases. Typically each layer is connected to at least one database. Further typically, changes in one or more factors and/or components alters the data held in said databases.

In one embodiment the databases can comprise, separately, or in combination, data from one or more sensors which detect the condition of features of the organisation and/or data relating to the operation of the organisation and/or data relating to the condition of hardware of the organisation.

Typically therefore the model represents the "real world" and provides indications of the consequential effects caused by the causal links.

In one embodiment the first layer of the model provides the "real world" model using data from the one or more databases and the second layer represents a simulation of possible outcomes based on the real world model of the first layer. As a result, the user no longer has to use the conventional method of setting out hypothetical situations. Furthermore, the need for the use of skilled analysts is reduced and hence the bottleneck in the analysis of organisations which they can, on occasion, create is removed. This is due to the fact that the first layer of the model is effectively a mapping of the real world in which the organisation exists.

In one embodiment the elements and/or sub-elements form one or more nodes in at least the first diagrammatic model.

Typically the model layers are provided as a visual display. Most typically on a display screen, such as the display screen of a PC. Typically control means are provided to allow user selection of elements from the visual displays and/or to make queries of the model, and data processing means are provided to retrieve and process data to allow the model layers and the visual display to be adapted in response to the user query.

In a second aspect of the invention there is provided a model for an organisation and relating to a plurality of projects performed by the organisation, each project having a plurality of features represented by elements and one or more sub-elements, said model including a first model layer and at least a second model layer;

said first model layer including one or more elements and one or more sub-elements whereby said elements and/or sub-elements are connected by one or more links indicating a relationship between two or more of said elements and/or sub-elements, and at least one element and/or sub-element includes one or more attributes associated therewith, wherein the at least second model layer includes said one or more elements and/or sub-elements connected by said one or more links and further includes links to one or more factors or components that influence one or more linked elements, sub-elements and/or attributes.

In one embodiment the attributes are populated with data or information concerning the current and/or previous conditions, states or statuses of the element and/or sub-element.

In a further aspect of the invention there is provided a causal model for an enterprise or business process, said model comprising at least two layers, at least one of which represents an organisation's assets and capabilities a plurality of linked nodes wherein a second or further layer represents the factors and/or components, the performance of which affects linked nodes.

Typically the relative performance of the factors and/or components can be visualised or displayed to the user in at least the second model layer.

In a further aspect of the invention wherein there is provided a node display for the state, status or condition of an element and/or sub-element in real time. Typically the state, status or condition at a time in the future and/or past is displayed.

Specific embodiments of the invention are now described with reference to the following figures wherein.

Figure 1:
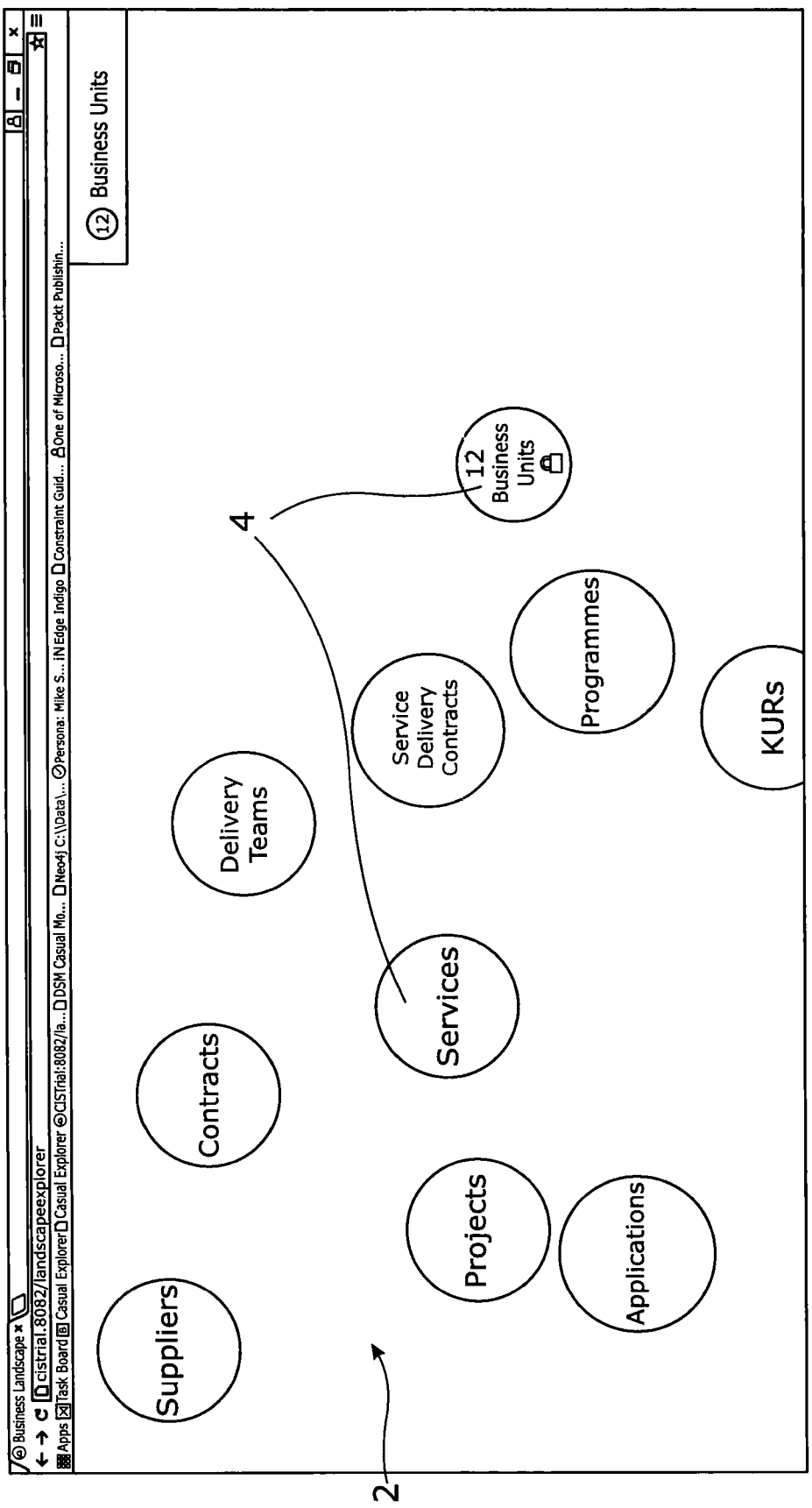
FIG. 1 shows a diagrammatic representation of an organisation model in accordance with one embodiment of the invention.

FIG. 1 displays the first layer of a business model 2 and which provided a business landscape layer of an organisation which delivers programmes of work via a service model. In the scenario depicted, a business analyst finds high spend service contracts which have very high service costs and must determine the best course of action available within the business model to reduce said service costs.

Figure 2A:
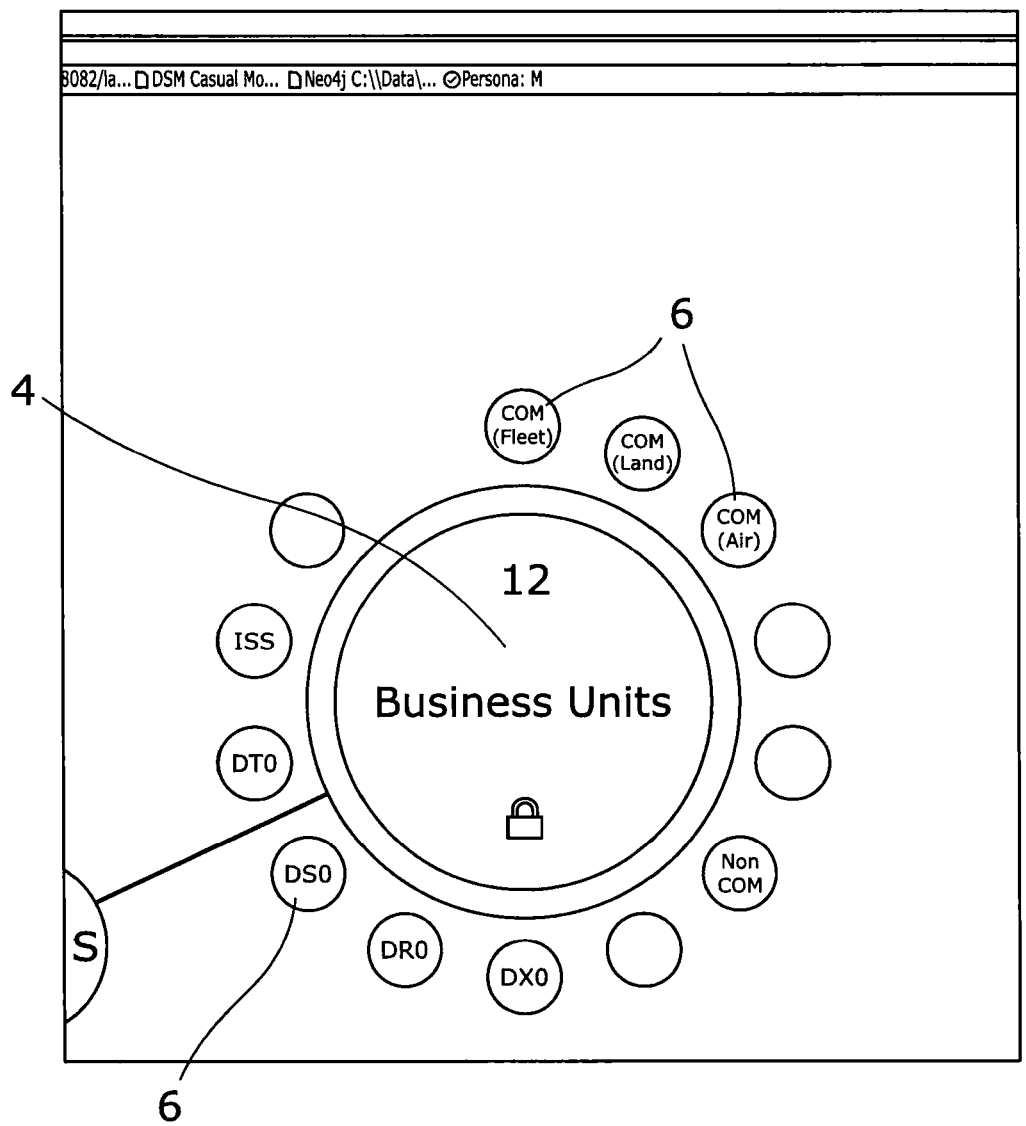
FIGS. 2a and 2b show the arrangement of model elements and sub-elements in accordance with one embodiment of the invention.
Figure 2B:
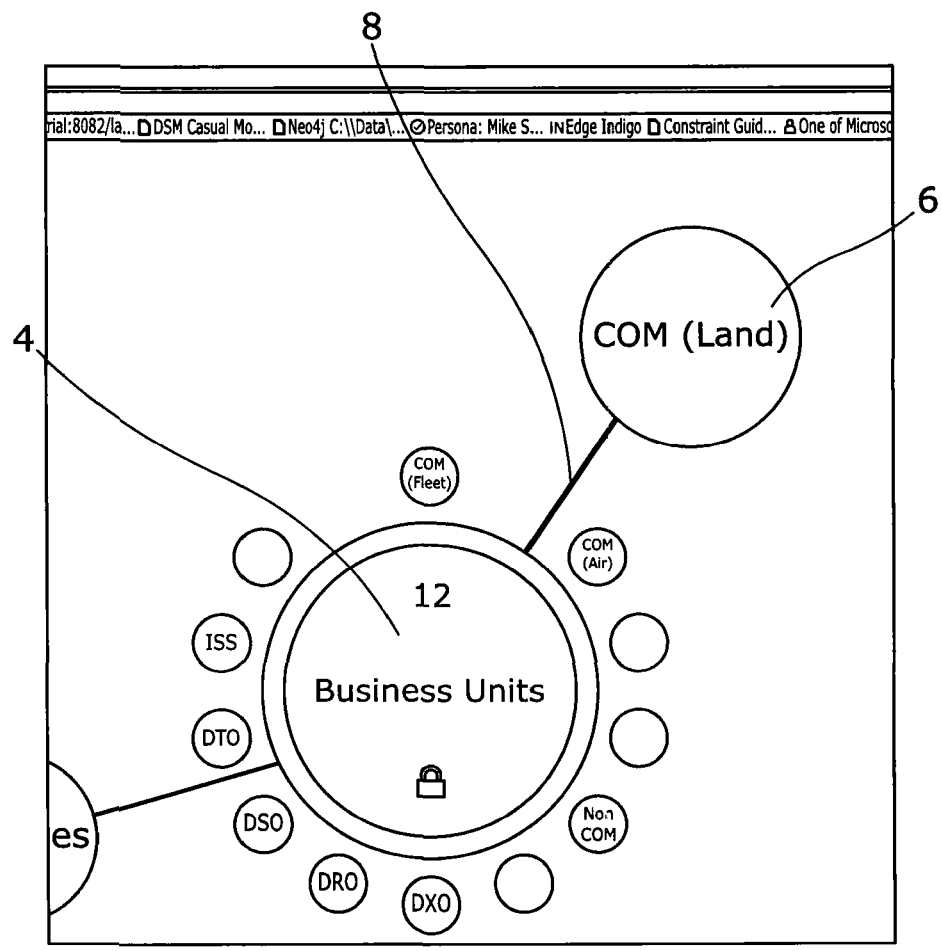

The business comprises a number of core elements 4. Associated with each element is a number of sub-elements 6, displayed in this example as a planetary arrangement with a number of sub-elements arranged circumferentially or orbiting the same. Once selected the linkages 8 between the elements and/or sub-elements are visible. This planetary arrangement is depicted in FIGS. 2a and 2b wherein all twelve sub elements 6 of the Business Unit element 4 are shown orbiting the same.

Figure 3:
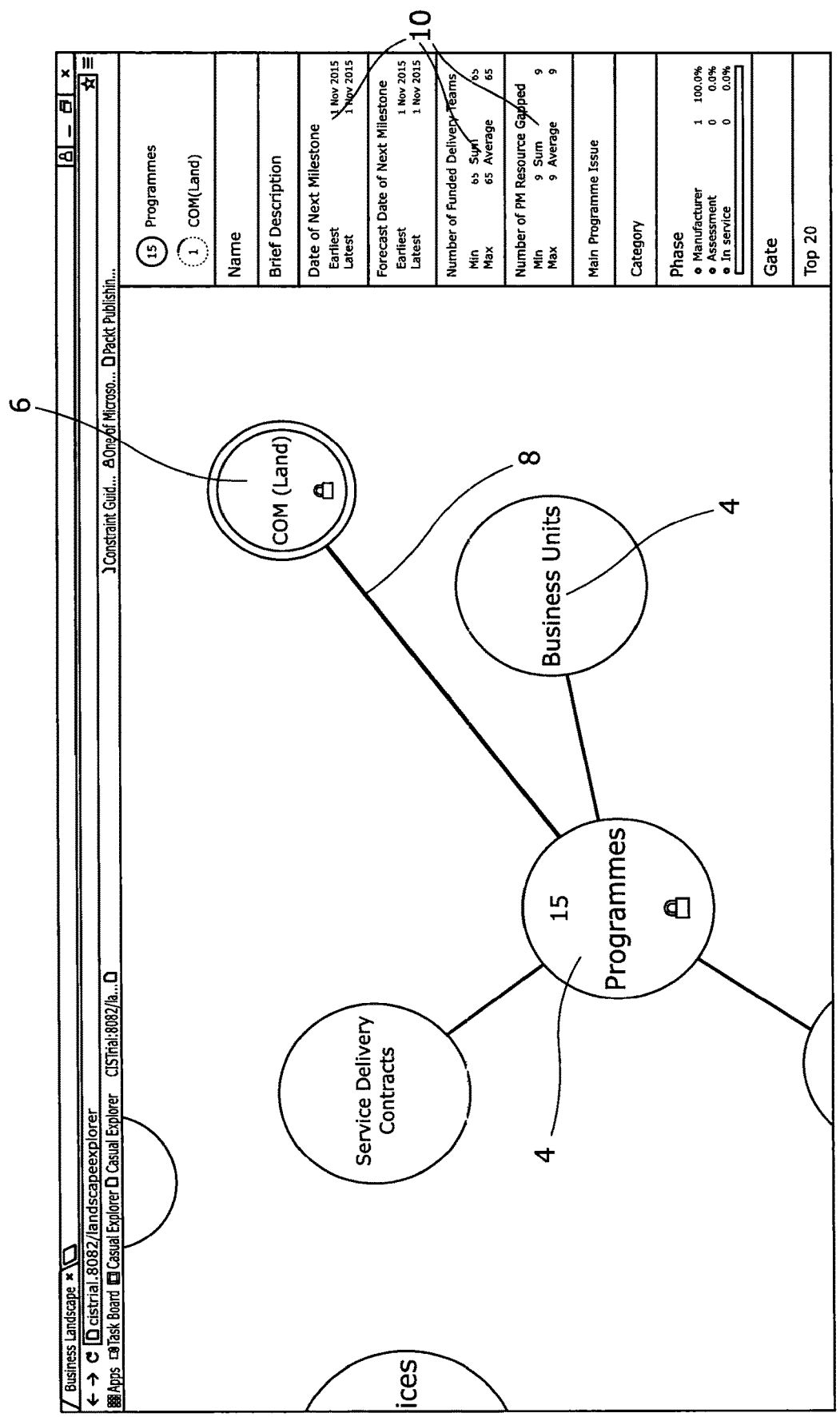
FIG. 3 shows a further representation of the relationship between element and sub-elements in accordance with one embodiment of the invention.

The selection of elements and/or sub-elements and the display of linkages between the same allow the user to traverse the relationships between the same. In FIG. 3 the relationship between the COM (Land) sub-element 6 and the Programmes and Business Units elements 4 is displayed. Furthermore, the current contextual selection of the Programmes element displays in a window on the right of the displays all the attributes 10 of the element.

Figure 4A:
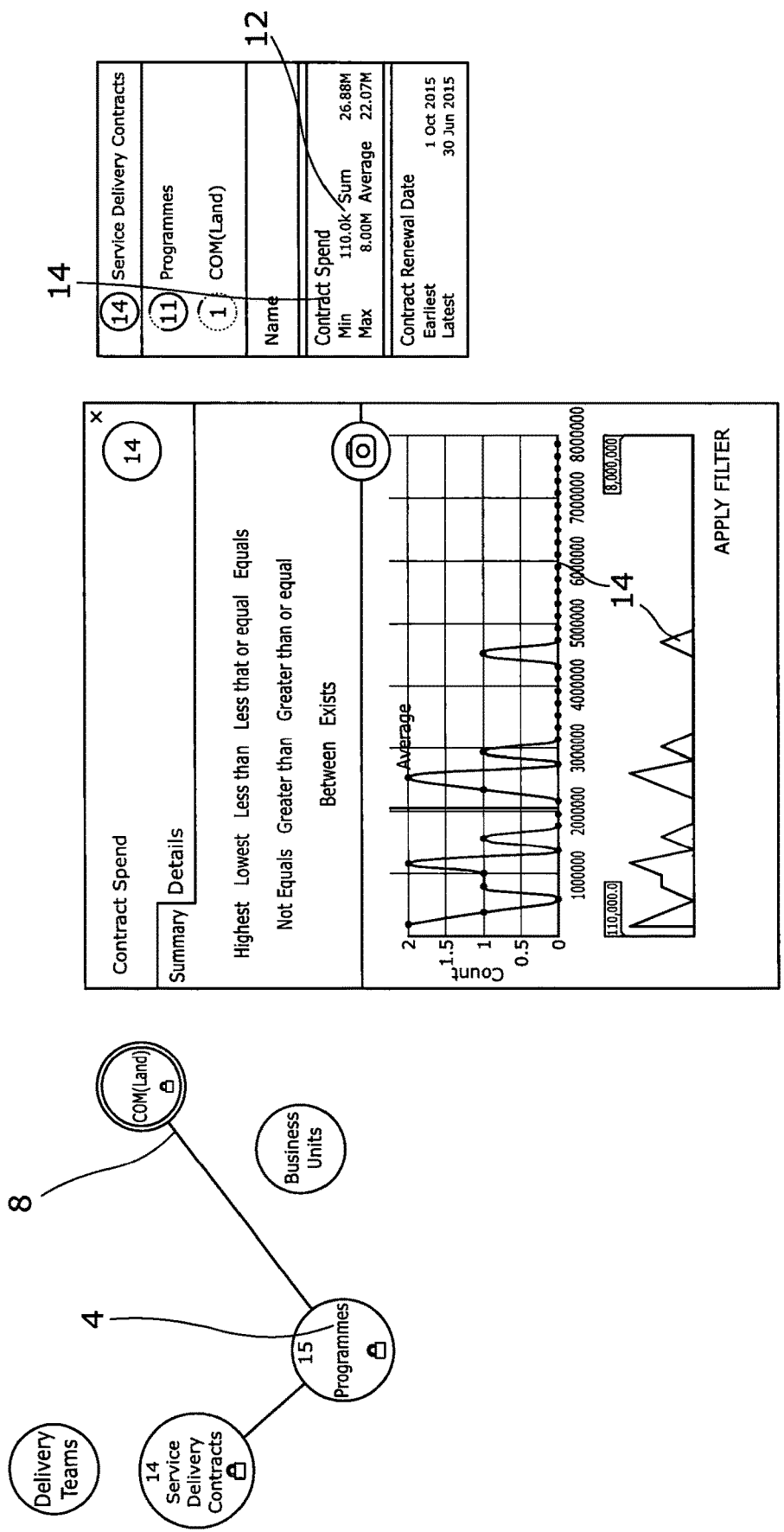
FIGS. 4a-4c show a representation of the attributes of a selected element of the business model.
Figure 4B:
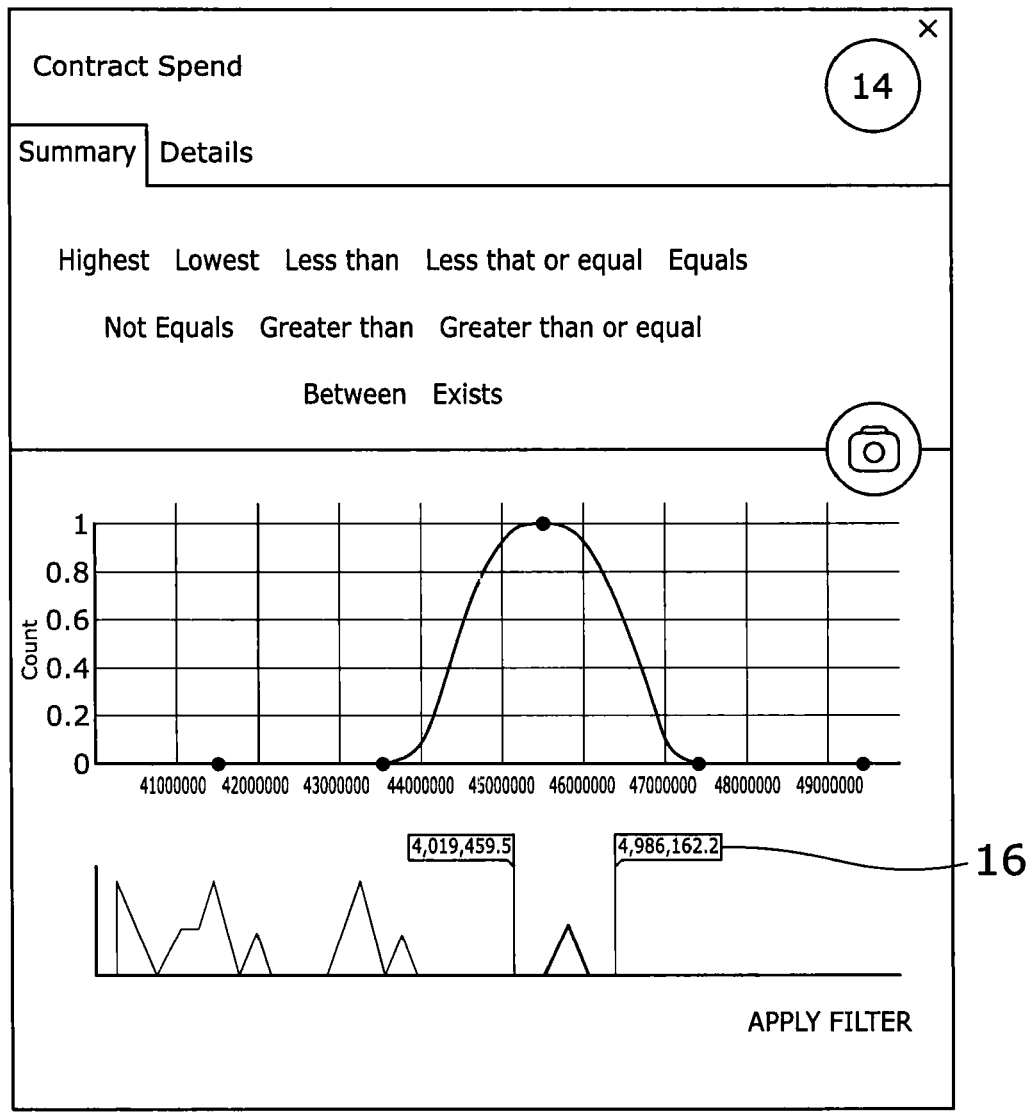
Figure 4C:
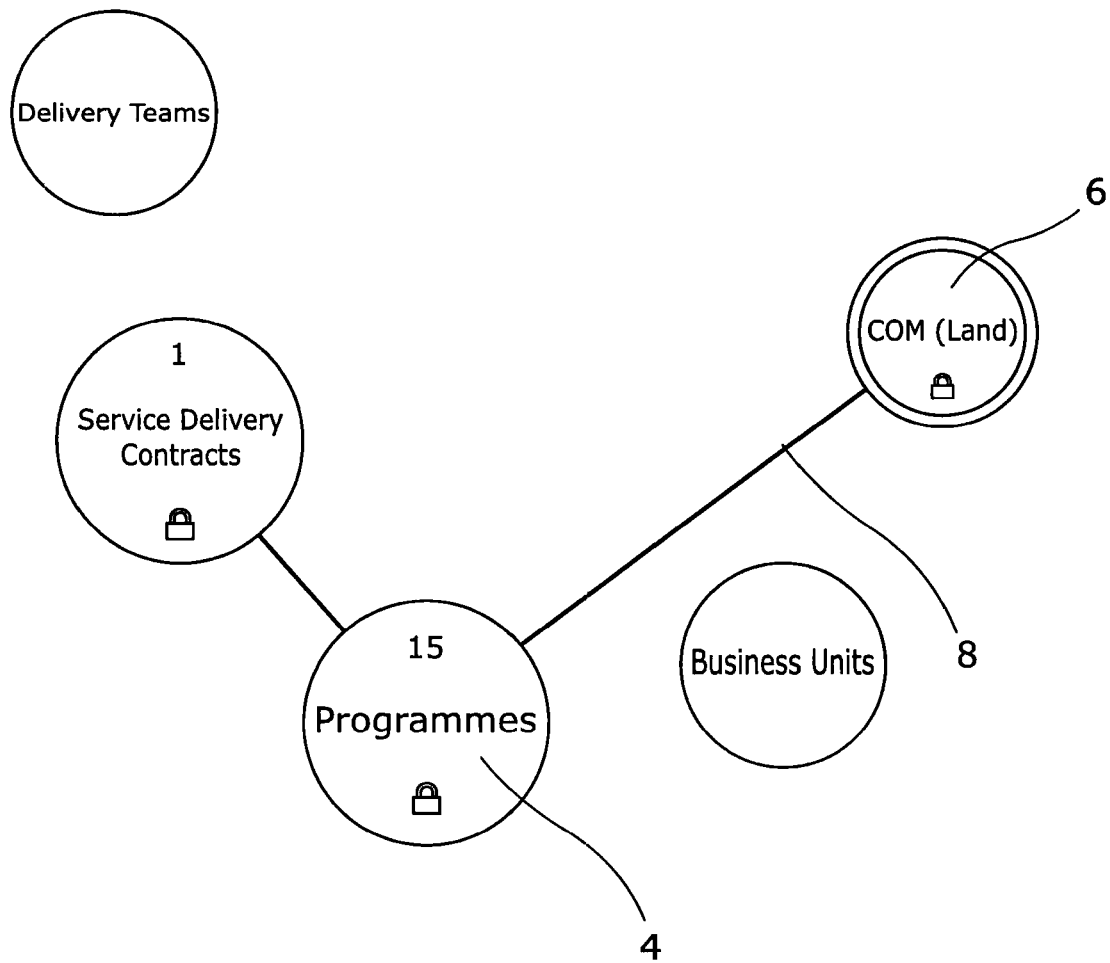

FIGS. 4a-4c shows how the user can explore further the relationships between the elements and sub-elements and drill down into the attributes to identify single instances of performance. The data populating the attribute 10 tables 12 and graphs 14 is stored in one or more databases connected to the business model. Using filters or range selectors 16 the attribute data can be explored, in this example to a single instance as shown in FIG. 4c. Throughout the attribute data exploration the contextual business model display in the first layer is maintained.

Figure 5:
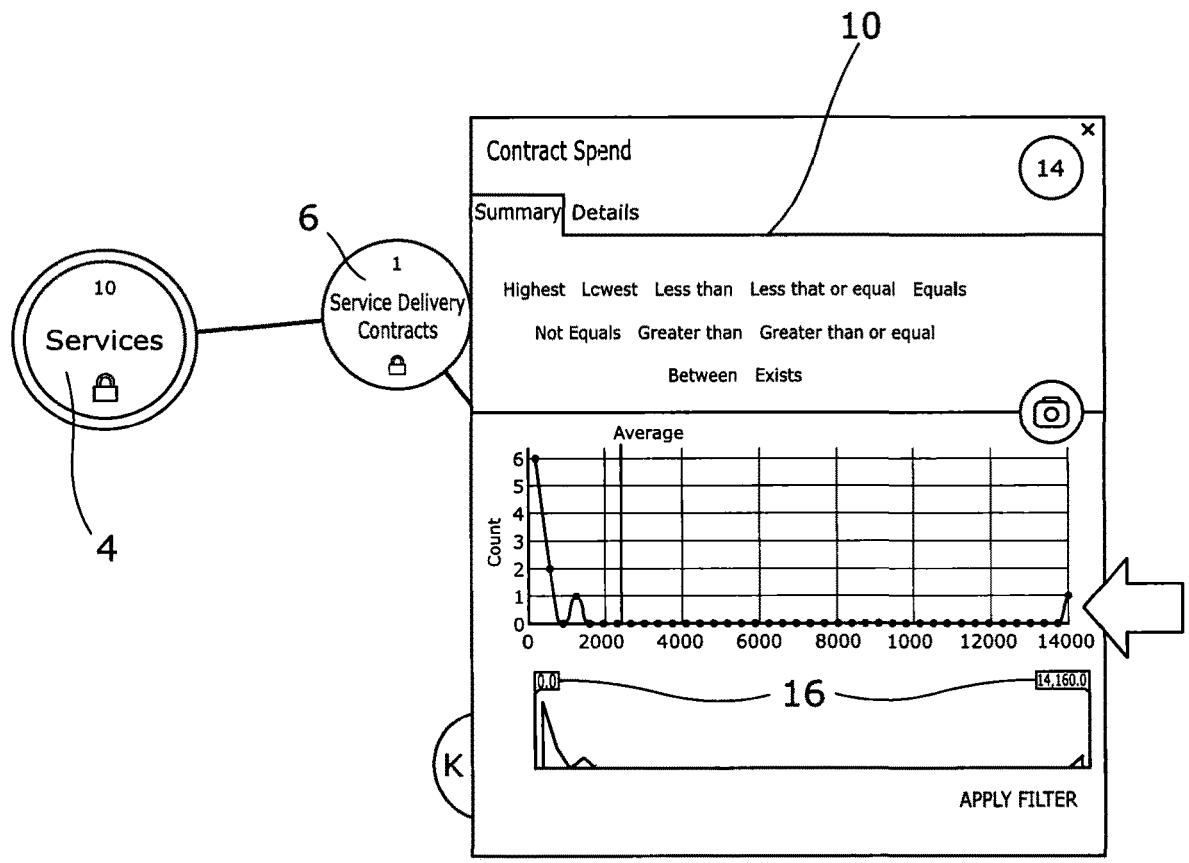
FIG. 5 shows a representation of the application of a filter to the elements and sub-elements of the business model.

FIG. 5 shows the result of applying the same attribute filter to the Services element 4 wherein the Service Unit Cost sub-element 6 appears to contain an outlier in comparison to the other sub-elements linked to the Service element 4.

Figure 6:
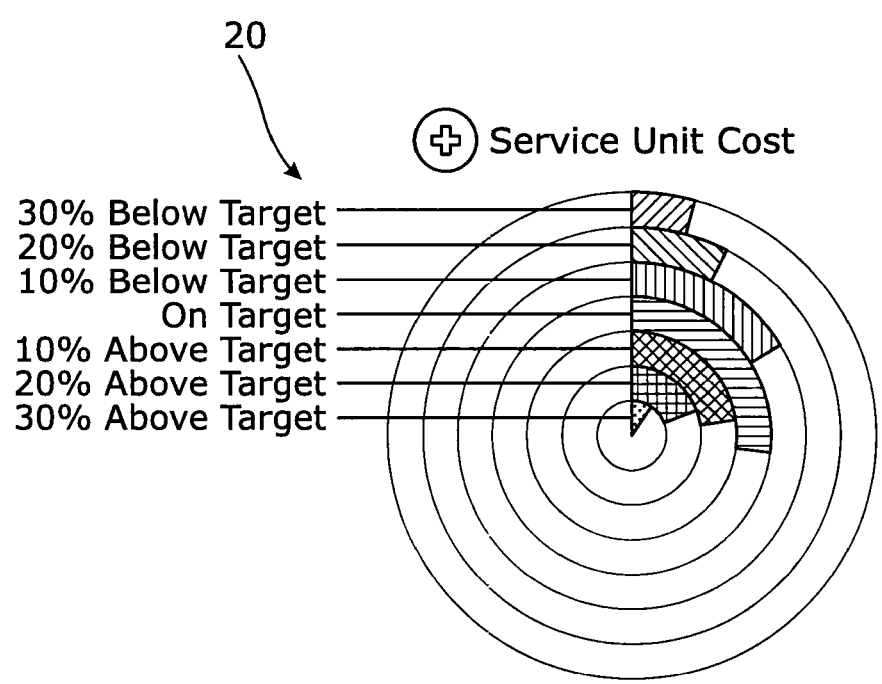
FIG. 6 shows a representation of a second layer applied to the business model in accordance with an aspect of the invention.
Figure 7:
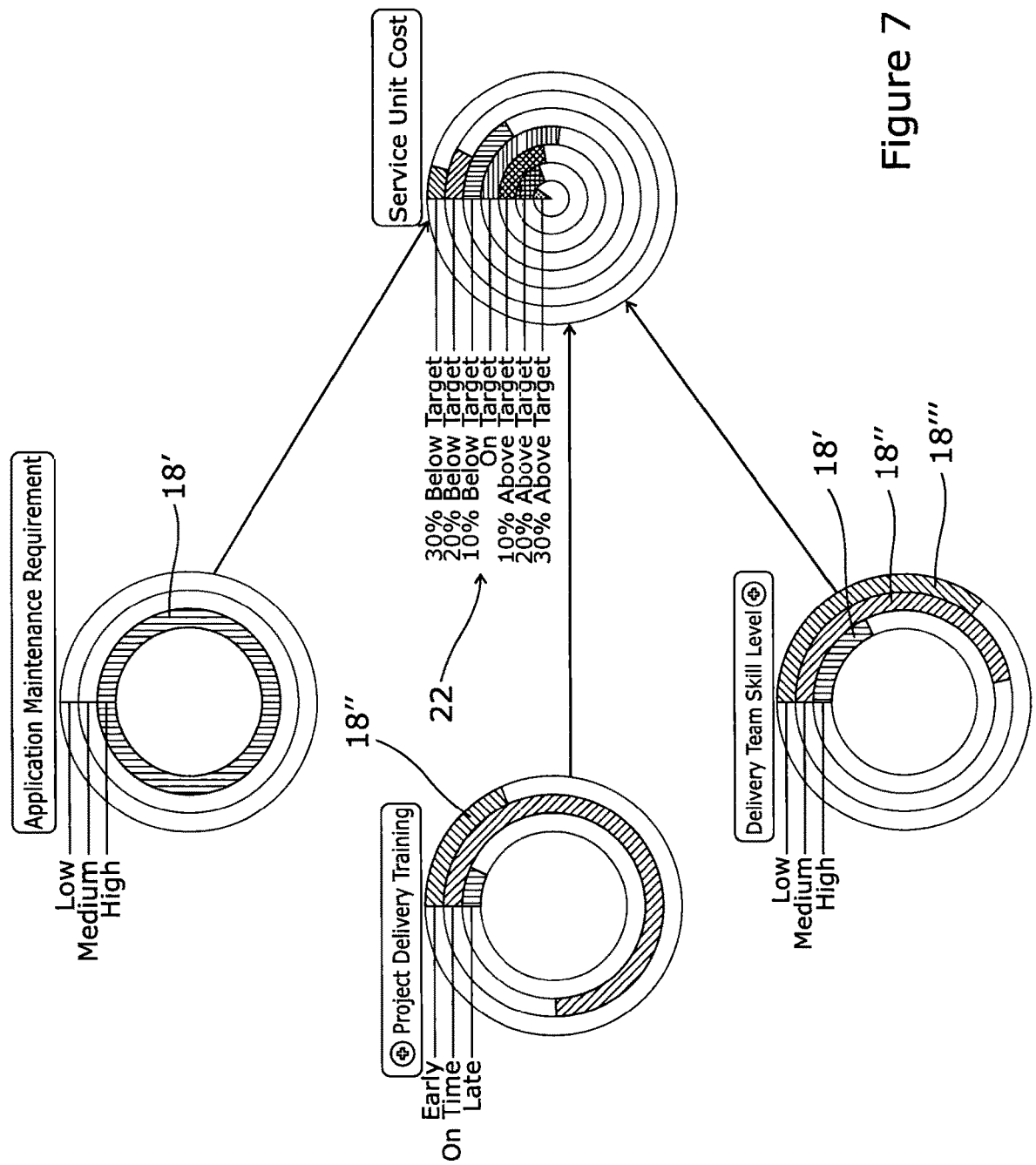
FIG. 7 shows a representation of the causal influences on an element of the business model in accordance with one embodiment of the invention.

To understand what factors influence the Service Unit Cost sub-element 6, the display can be selectively switched to a second modeling layer 20 which shows the causal and effects of changes of the same. FIG. 6 shows such a layer 20 whereby the discrete state model of Service Unit Cost is overlaid on the first layer. Expanding out from this view the factors of the causal influencers 8 shown within those elements and/or sub-elements is displayed. Such a representation is shown in FIG. 7, whereby the elements and sub-elements that directly influence the Service Unit Cost sub-element are shown. The causal influencers in this example are the Application Maintenance Requirement 6a, Project delivery Timing 6b and delivery Team Skill Level 6c. The influencers can be elements in their own right or sub-elements of one or more further elements. The factors 18 within these influencing elements and sub-elements are colour coded and have a causal link or effect on the components 22 of the Service Unit Cost, the components in this example being the probability of being 30% below target cost, 20% below, 10% below, on target and further increments of 10% to 30% above target service unit cost.

The factors 18 and components 22 are shown as coloured rings or segments thereof. The size of the segment is indicative of the probability of a factor or component being in a particular state and/or condition.

Figure 8:
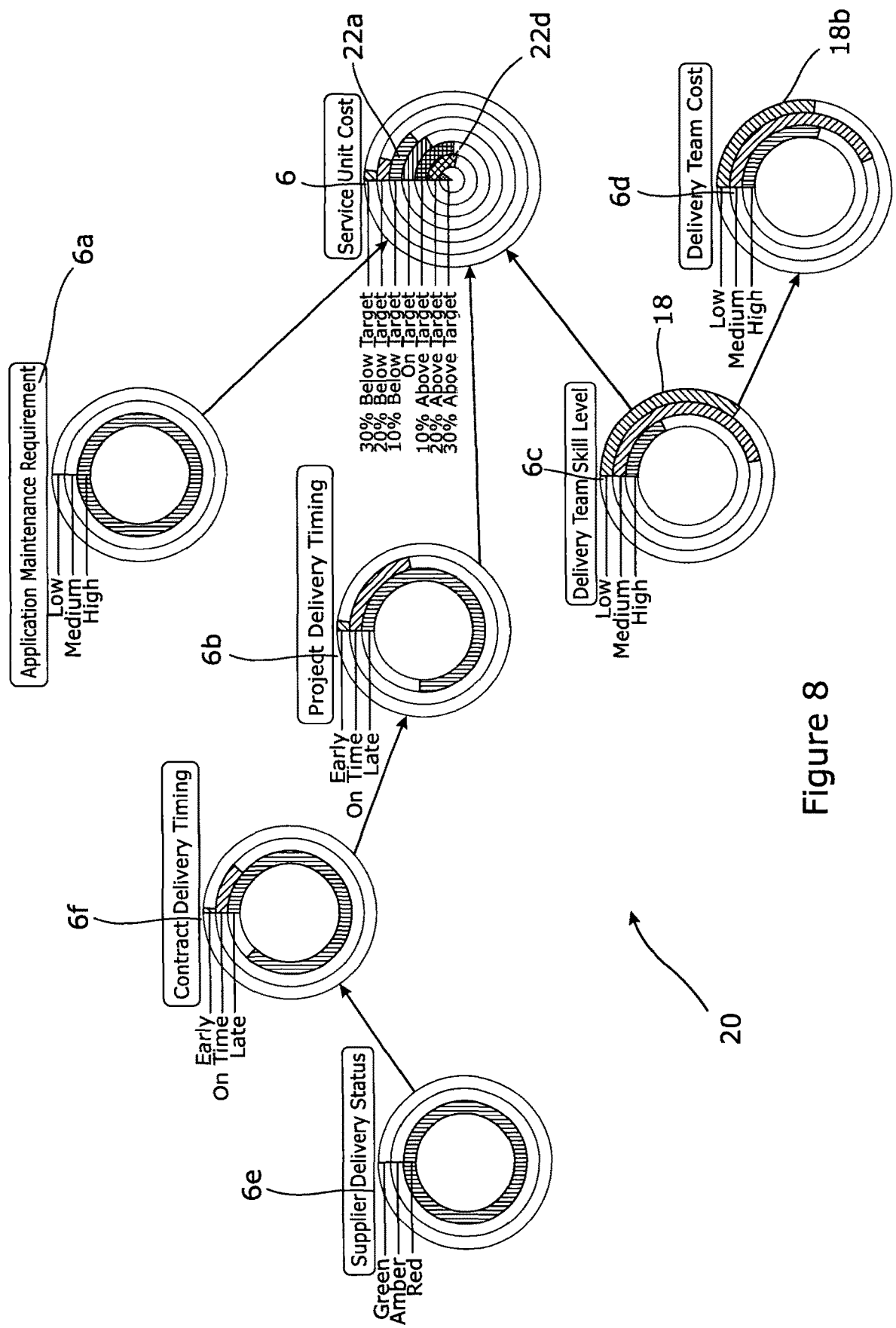
FIG. 8 shows the expansion of a representation showing further causal influences in accordance with one embodiment of the invention.

Expanding further out from FIG. 7 to FIG. 8 the user can explore further influencing factors 18 found within other elements 4 and sub-elements 6a-6f. For example the user can readily ascertain that the Delivery Team Skill Level 6c has a direct influence on the Delivery Team Cost sub-element 6d. In this example the 'low' Delivery Team Skill Level factor 18a is colour coded green, the 'low' Delivery Team Cost factor 18b is correspondingly colour coded green to show that the influence or causal link that a low delivery team skill level likely results in, or at least influences the cost of a delivery team, in this case the factor influences the likelihood of a low cost.

Furthermore, it can be seen by the user from this second layer 20 that the Supplier Delivery Status sub-element 6e has a direct influence on the Contract Delivery Timing 6f. If the Supplier Delivery Status factor is red, indicating a poor status, the direct effect is that the Contract Delivery Timing 6f factor will be likely be late shown by the factor indicated by the red ring segment being nearly a full circle and therefore is depicted as having a very high chance of being late. The indirect effect of the Supplier Delivery Status being poor is that the Project Delivery Timing 6b sub-element is also highly likely to be late.

Taking these influencing factors 18 into account, the user can see that influence of the further factors on the Service Unit Cost 6 is most likely to fall between 'On Target' 22a to '20% Above Target' 22b components.

Figure 9A:
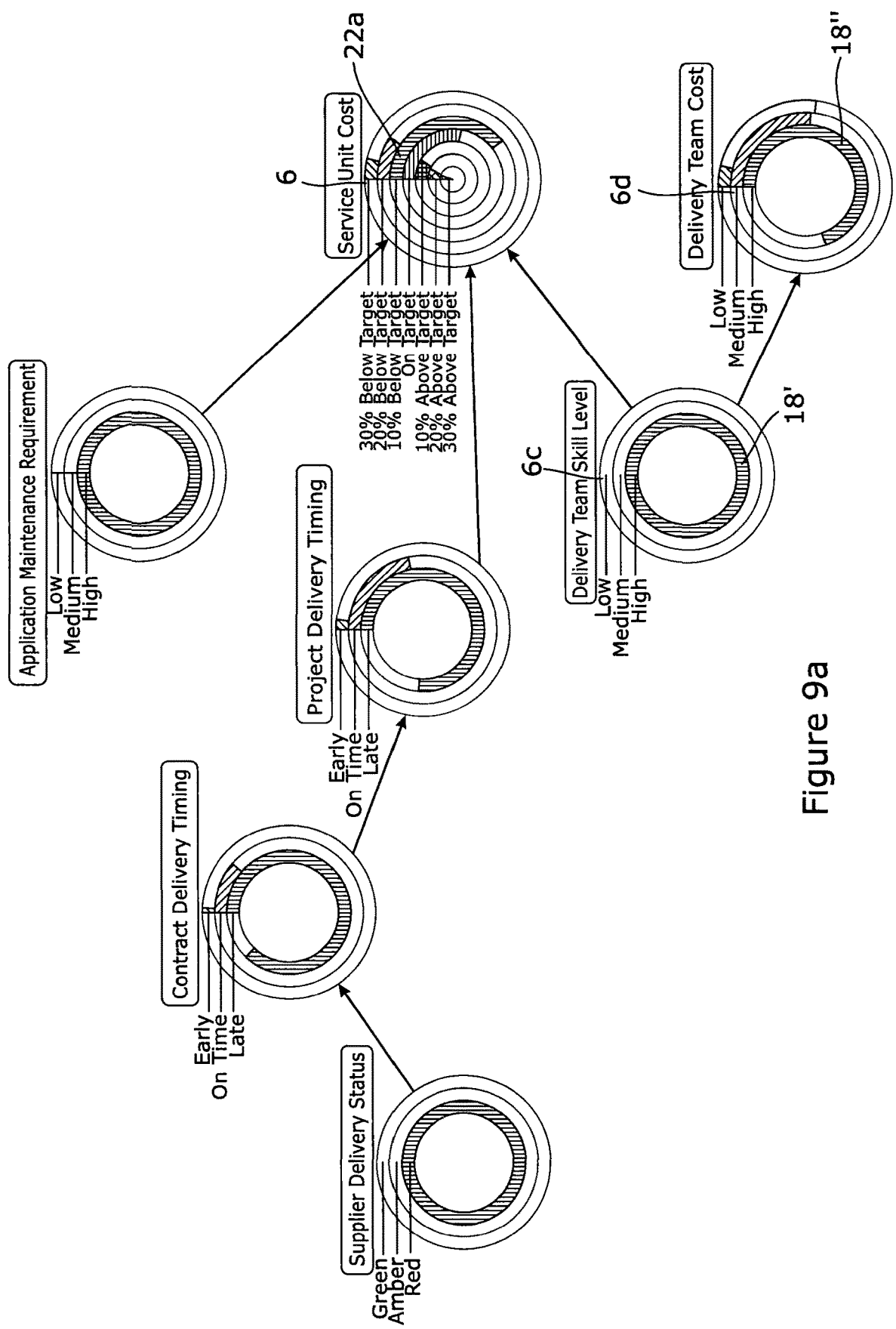
FIGS. 9a and 9b show representations of a second layer applied to the business model where one or more factors have been altered and explored in accordance with one embodiment of the invention.

Turning to FIG. 9a the user can continue to explore how different factors 18 influence the likely conditions of the Service Unit Cost 6 components 22. Here the user sets the Delivery Team Skill Level factor 18' to 'High'. Consequently, Service Unit Cost 6 becomes more likely to be 'On Target' 22a, which is desirable however, one additional consequence is that Delivery Team Cost 6d is significantly likely to be high 18".

Figure 9B:
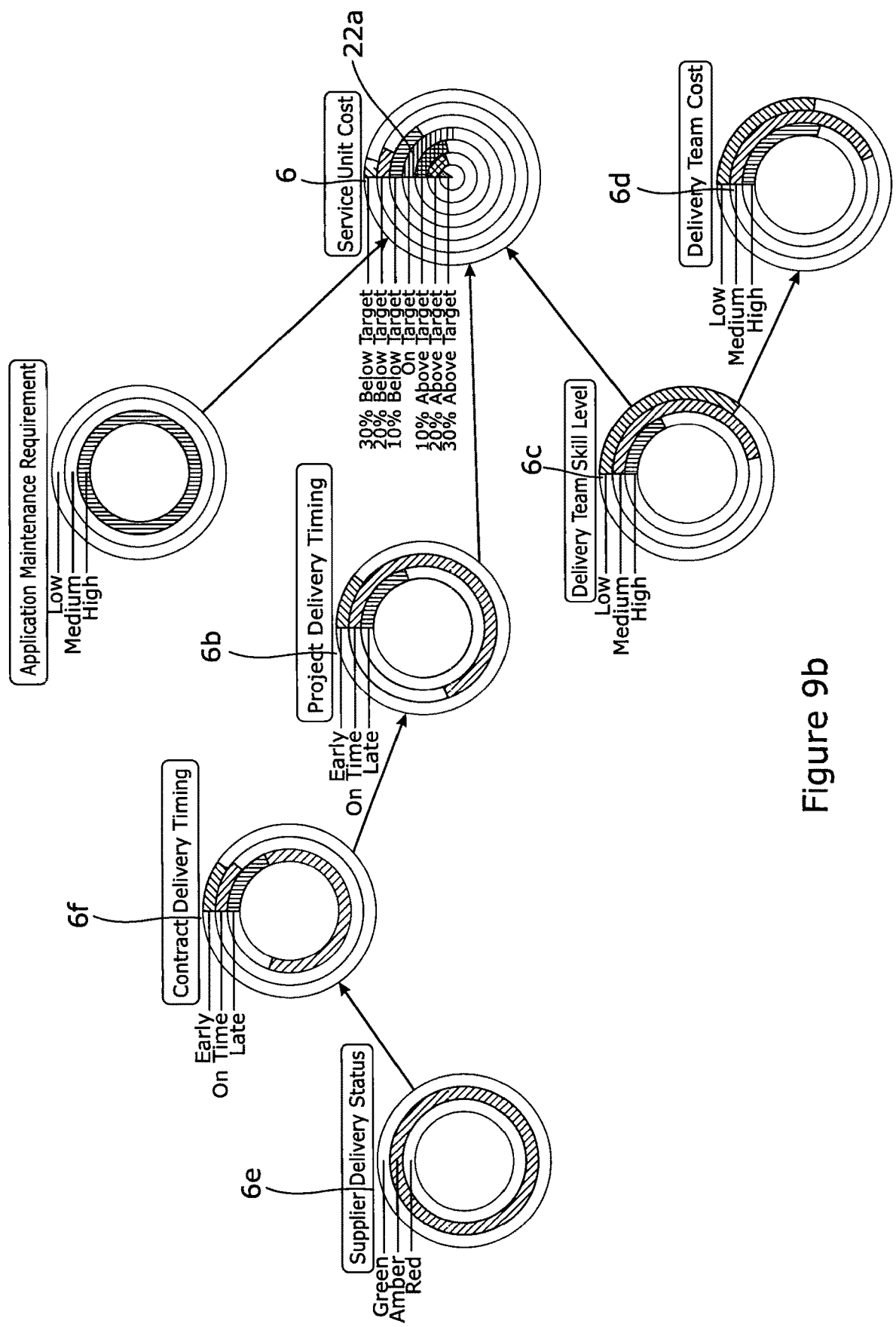

Further routes to the desired outcome can be explored by adjusting further factors 18. FIG. 9b shows the exploration of an alternative scenario wherein the user envisages switching supplier to one with a better Supplier Delivery Status 6e without any adjustment to the Delivery Team Skill Level 6c. The causal influence is that the probability of the Contract Delivery Timing 6f being 'On Time' is significantly higher, leading to the Service Unit Cost 6 condition being likely to be 'On Target' also. Whilst the probability is not as great in comparison with a 'High' Delivery Team Skill Level, this scenario does not result in a likely increase in Delivery Team Cost 6d. The user therefore has a plan to drive down the unit cost.

Figure 10:
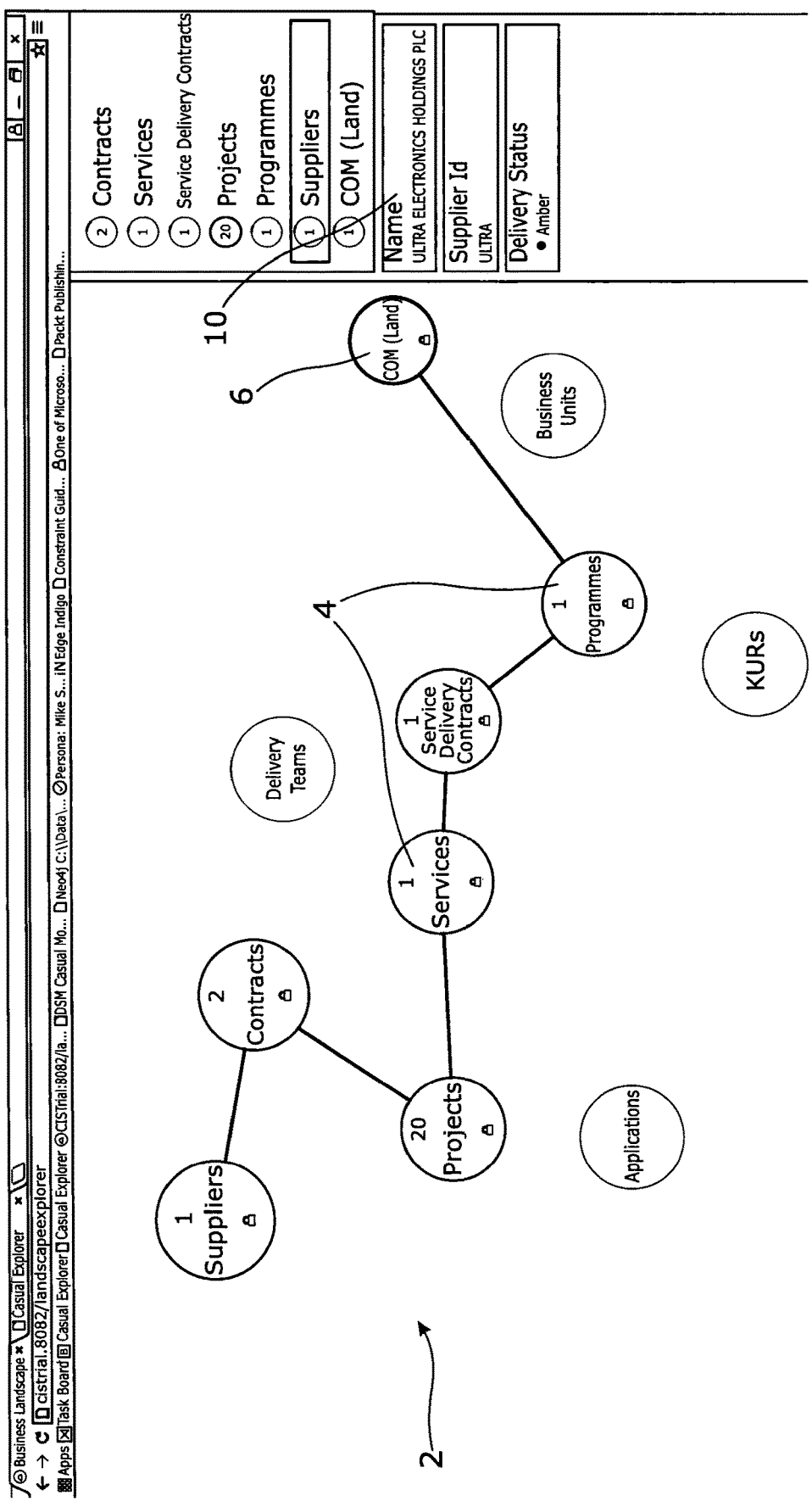
FIG. 10 shows a representation of a return to the first business model layer in accordance with one embodiment of the invention.

The user can therefore return to the Business Landscape layer 2, as shown in FIG. 10 where the causal links between the elements 4 are highlighted and therefore the user knows which element to interrogate and thus can seek out alternative suppliers and continue to monitor the Service Unit Cost. On selection of the Suppliers element 4 the attributes 10, including details of the current supplier, is shown adjacent to the model 2.

An example of use of the model of the invention is now set out with respect to a project in which there is a need to quickly predict what the best scenario for digitisation deployment of services is within a bank environment whilst taking account of events internally and externally of the bank environment. Elements which have to be taken into account include "customer details", "technology capability", logistics, infrastructure" and "staffing". Sub elements for the element "customer details" may include may include "customer gender", "customer age", "customer proximity to branch" and such like and sub elements can be created as required for each element and reference can be made to the bank customer databases to populate the elements and sub-elements and so generate layer 1 of the model.

In this example, there is a particular need to be able to identify and agree with everyone where the issues and opportunities lie in the home loans business, and to evidence the effect that digitisation initiatives are having on hard outcomes of branch cost and revenue. A first issue is that different managers will have different issues and requirements in relation to the digitisation and provision of the video service. For example the head of business change will need to account for major actions that are being taken to improve the achievement of outcomes where change is really business as usual, the business analyst will need to see what is really driving the outcomes, and the head of operations needs to account for how business operations are performing against outcomes.

Figure 11:
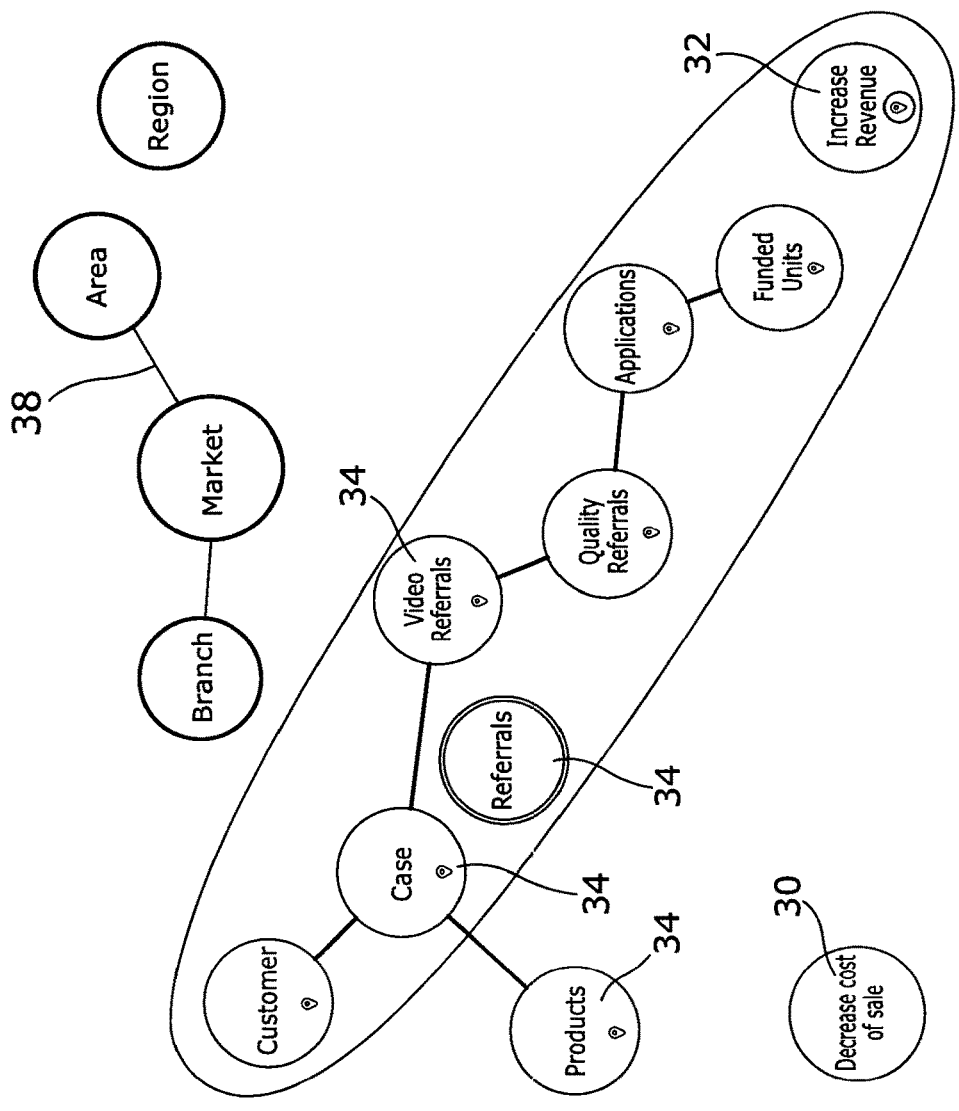
FIGS. 11-16 illustrate an example of the use of the model in accordance with the invention.
Figure 11:
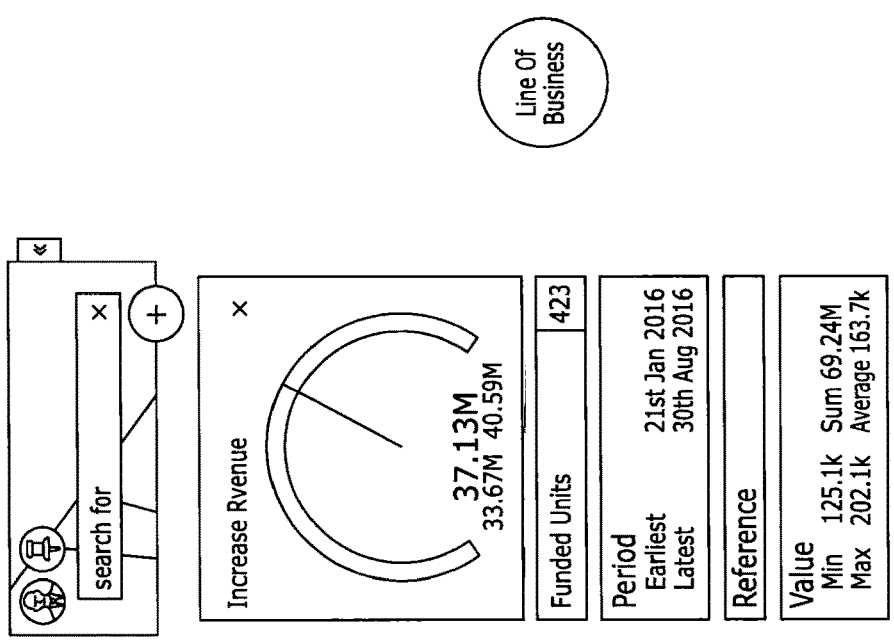

FIG. 11 provides an indication of the business landscape for the bank environments and indicate the different outcomes, cost outcome 30, increase revenue outcome 32, and the elements 34 which allow this to be achieved are also shown along with links 38. The attribute data 40 is also shown.

Figure 12:
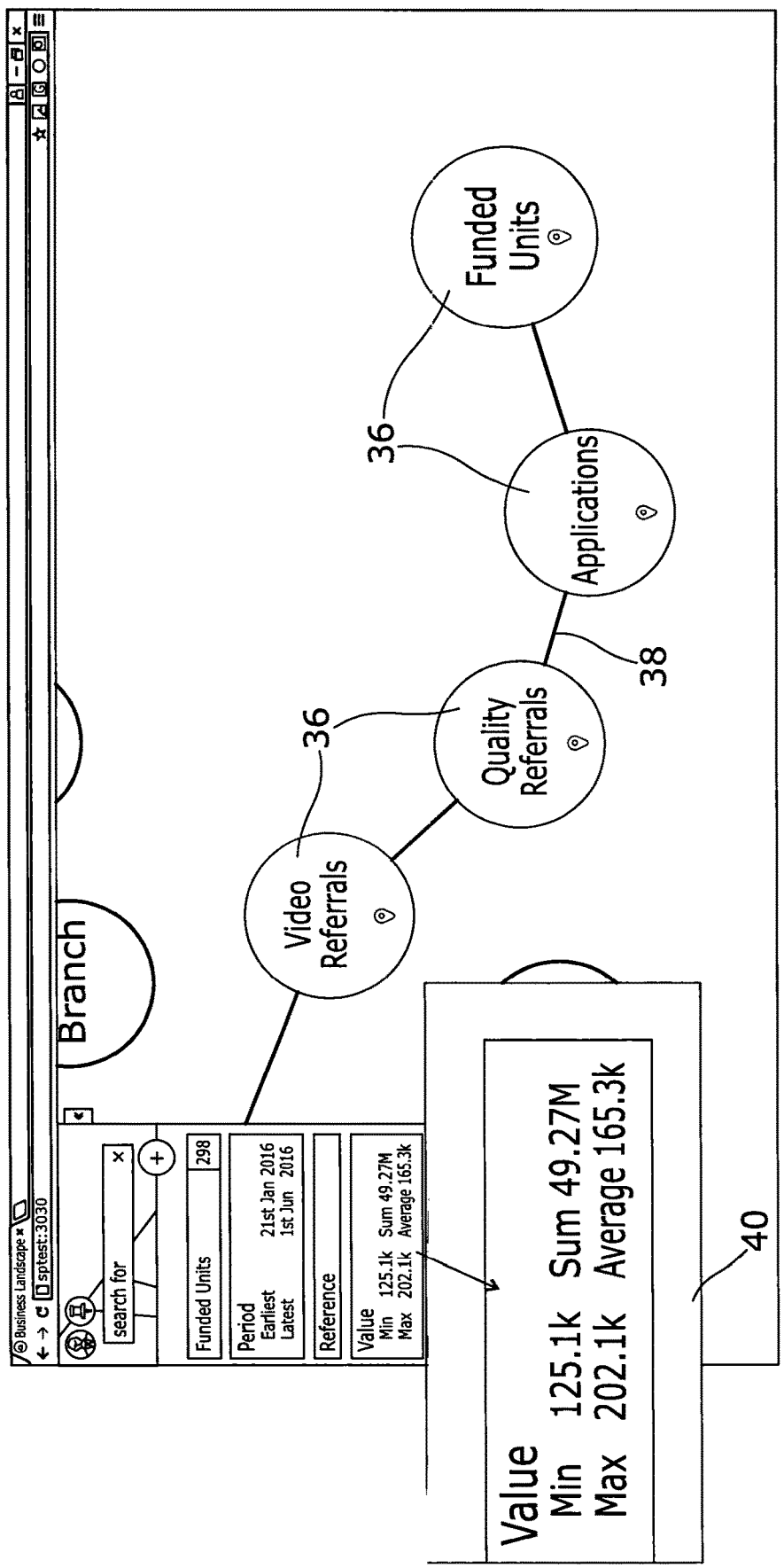

In FIG. 12 there are shown the group of elements 36 which need to be analysed in relation to the query "How much revenue is coming through digitisation in the form of the new video conference service?" The user can then explore through the relevant elements to see the relevant attribute data charts and graphs generated and the answer is $49M, with an average unit size of $165 k.

Figure 13:
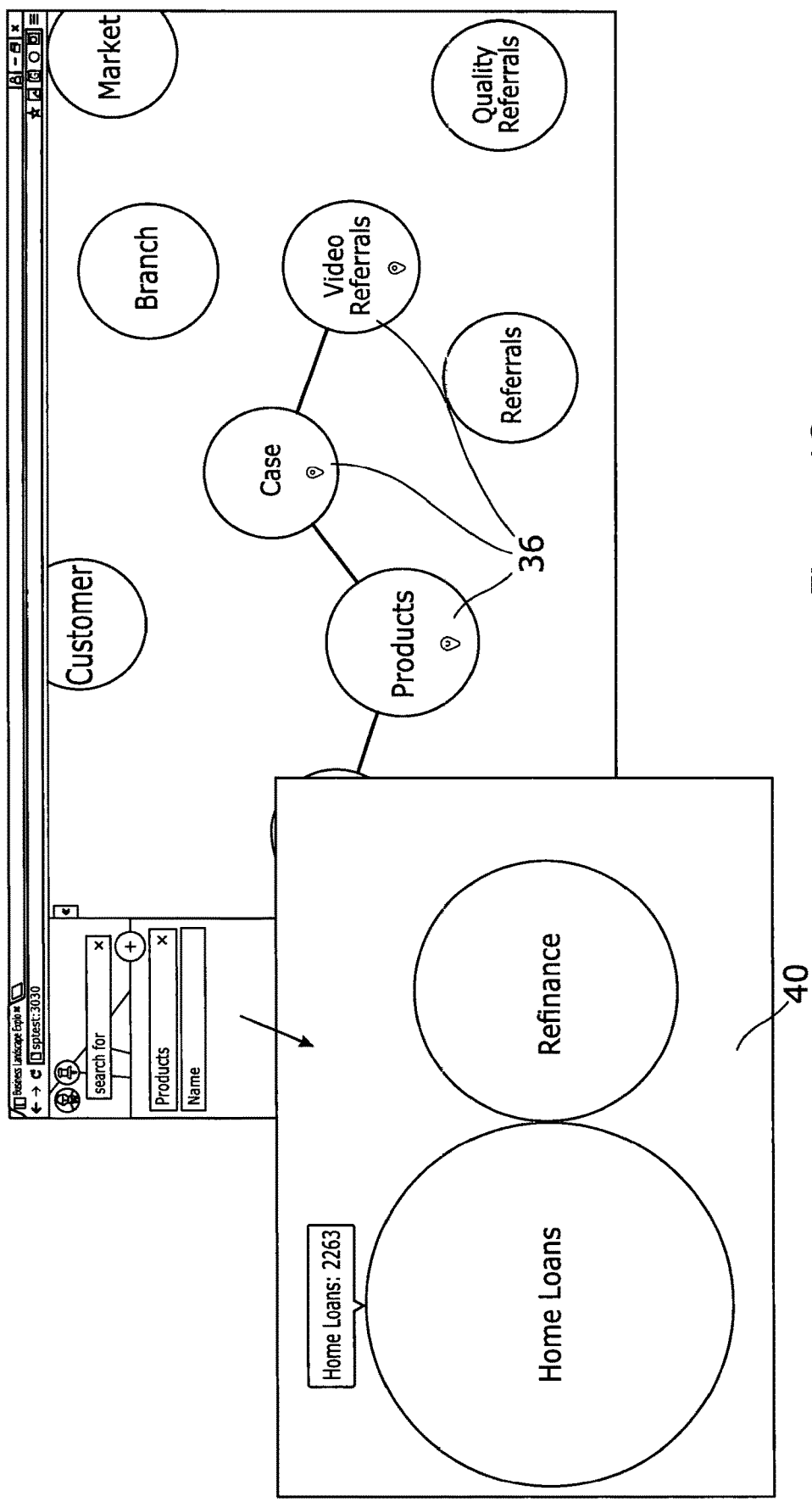

FIG. 13 illustrates how the same model of FIG. 11 can be analysed with a different question which is this case is "What products are we selling through the new video service?" In this case some of the same and different elements are referred to as in the previous question with the particular elements determined by the links between the same as set out in the model in accordance with the invention. The answer in this case is "Mostly Home Loans with the number being 2263.

Figure 14A:
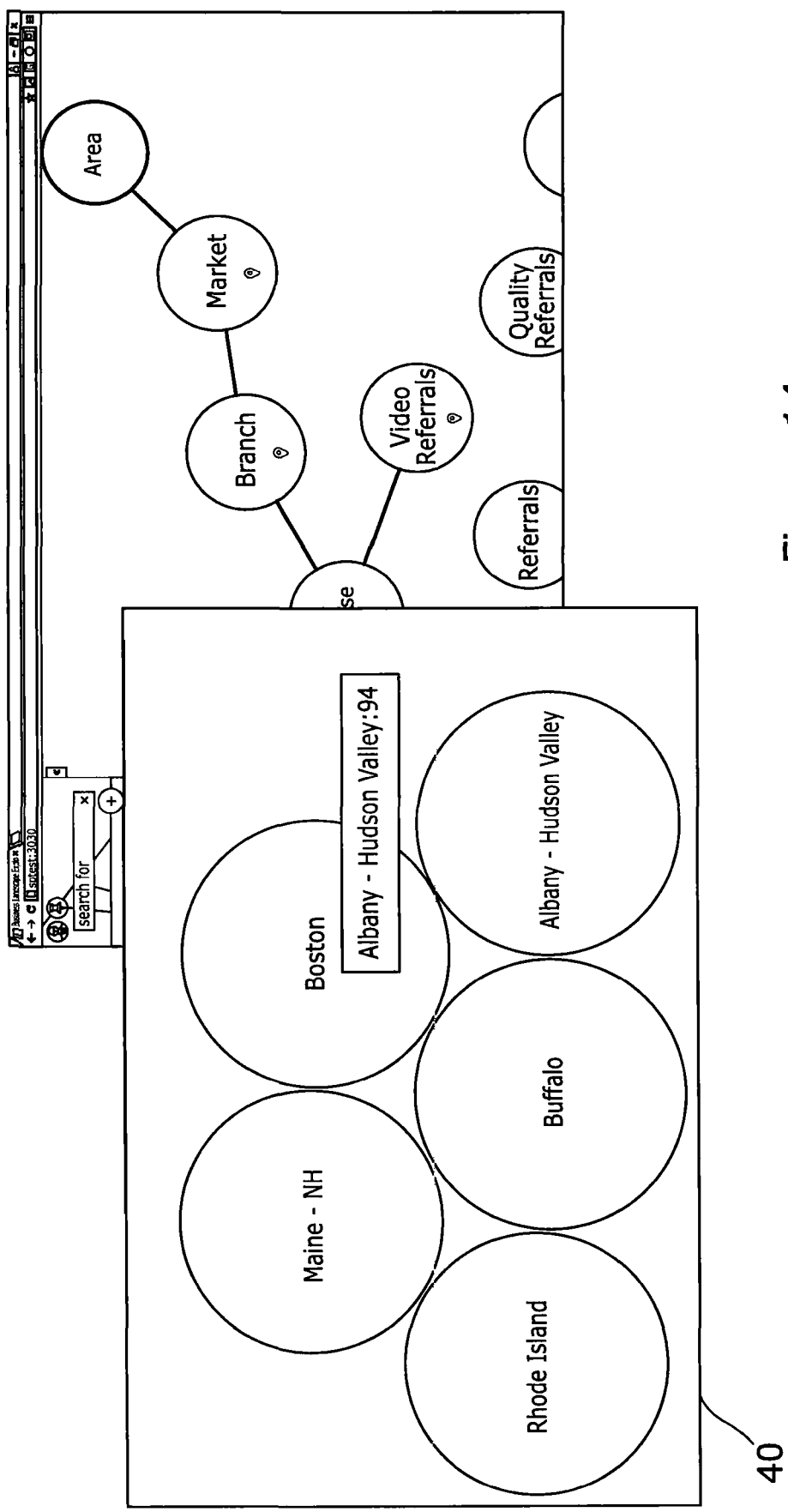
Figure 14B:
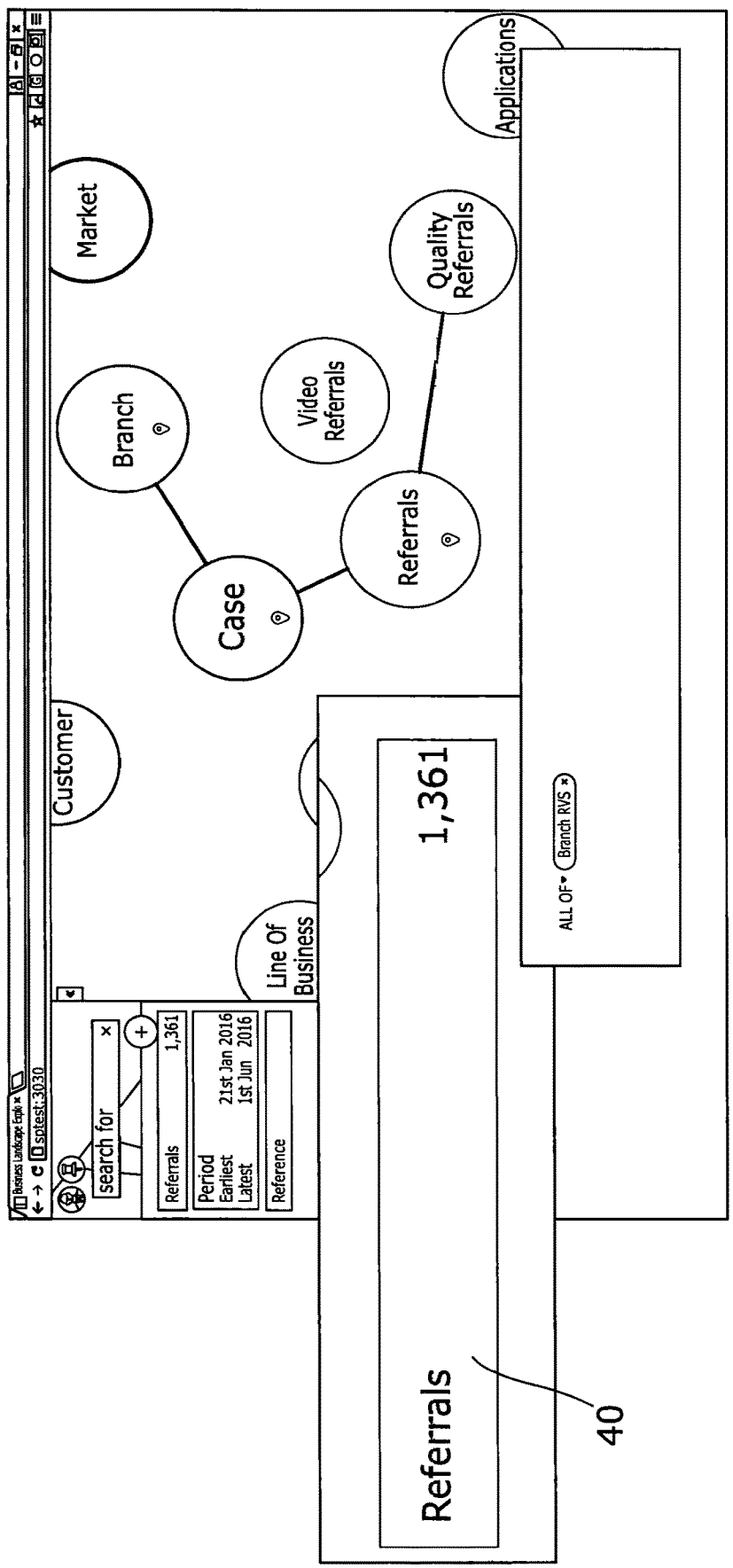

FIGS. 14a and b illustrate the manner in which relevant elements can be analysed in relation to further questions "Where is the service active?" in FIG. 14a and "Is the service replacing face to face referrals?" in FIG. 14b.

Figure 15:
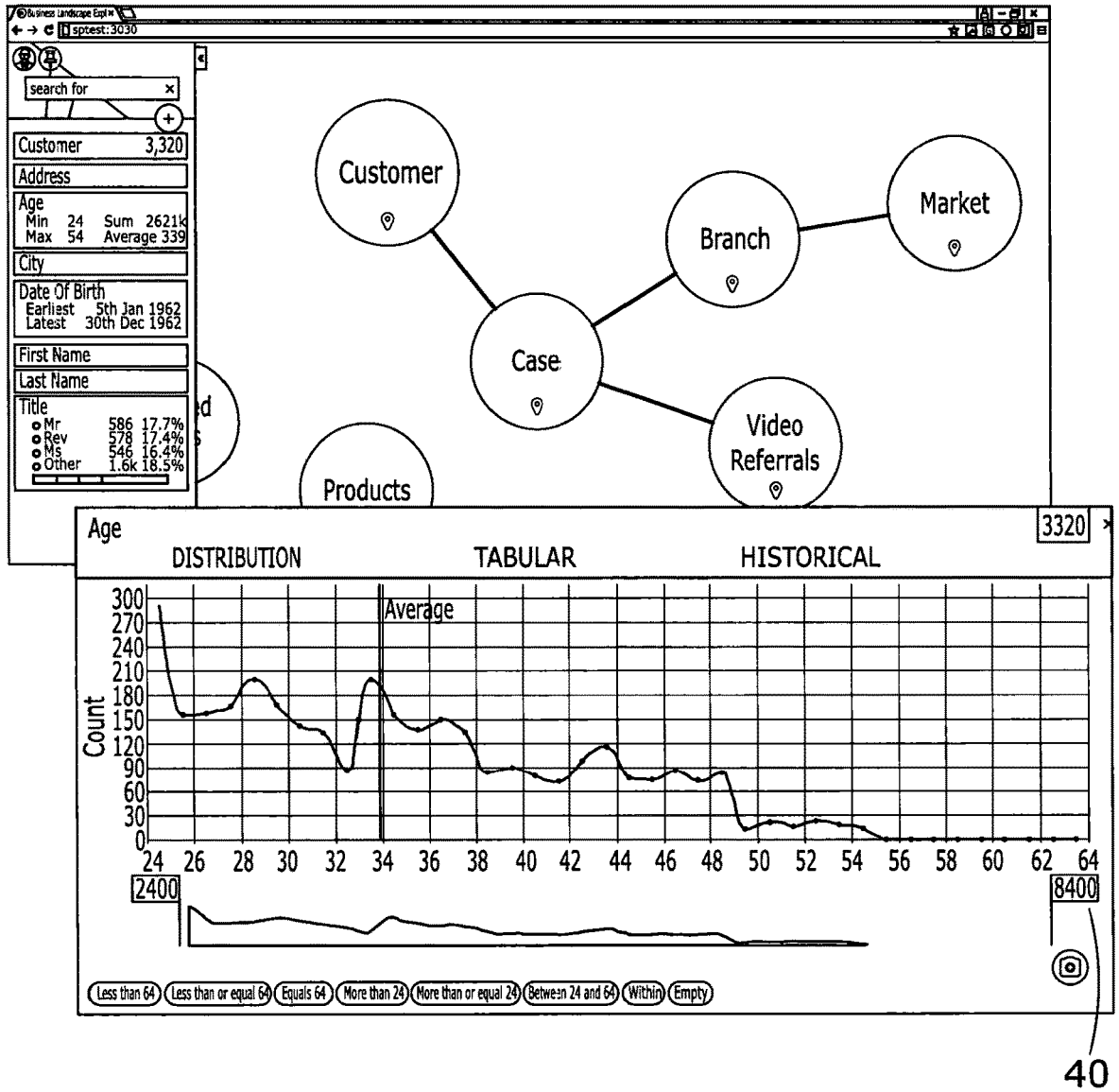
Figure 15:
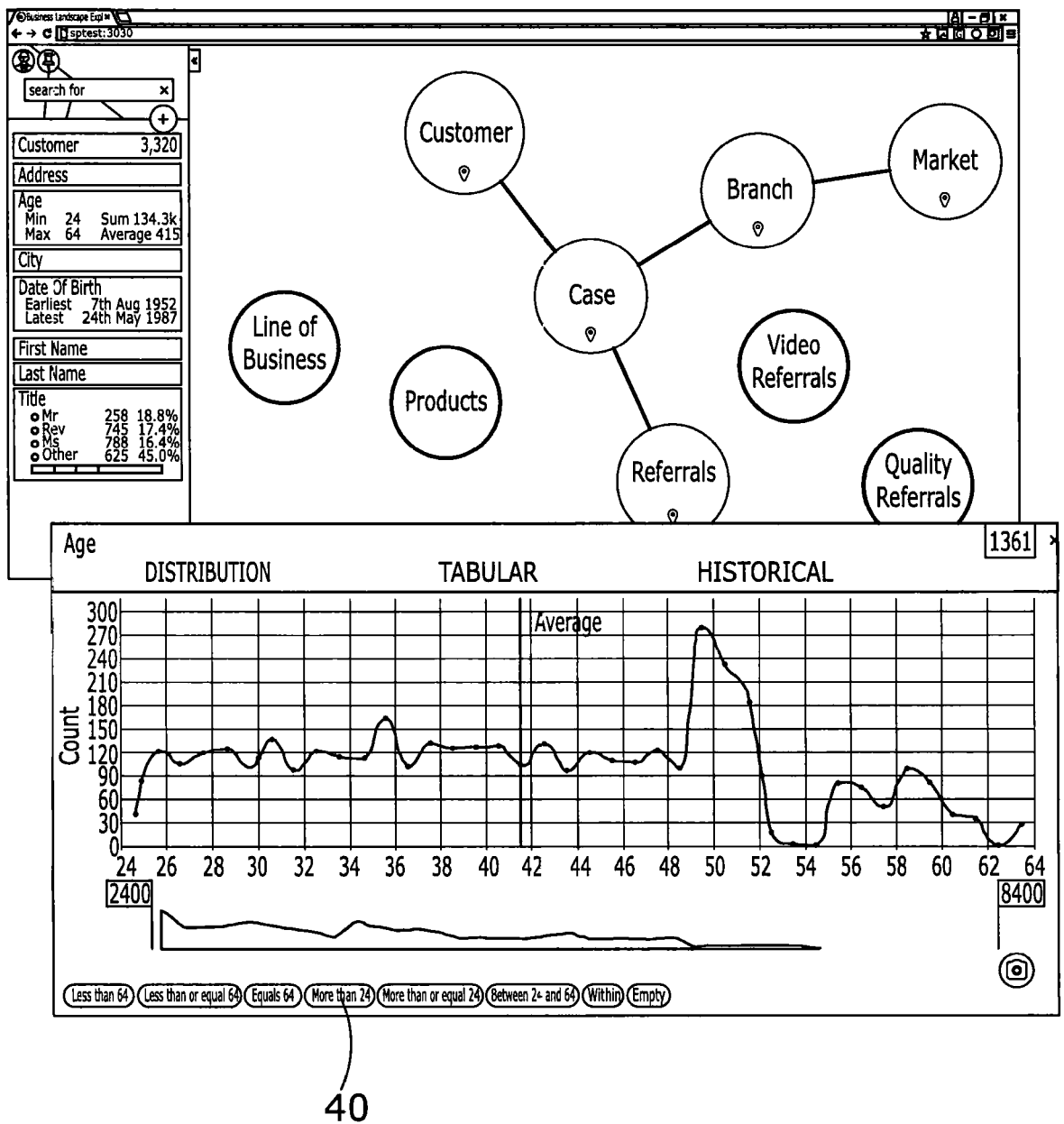

FIG. 15 illustrates further details which can be used to address an analysis of what is limiting the outcome with the question in this case being "what is interesting about the cases where there's not much uptake of the video service?" and the answer is found to be that the age profile of the customers for those branches where there is a lower uptake is higher than for branches that use the video service. If this analysis is something which is critical to a decision whether or not to implement or increase the video service, then the video service can be included as an additional element outcome in the model layer and, if required links to other elements can be created to thereby adapt the model to represent the organisation as it is at that time.

Figure 16:
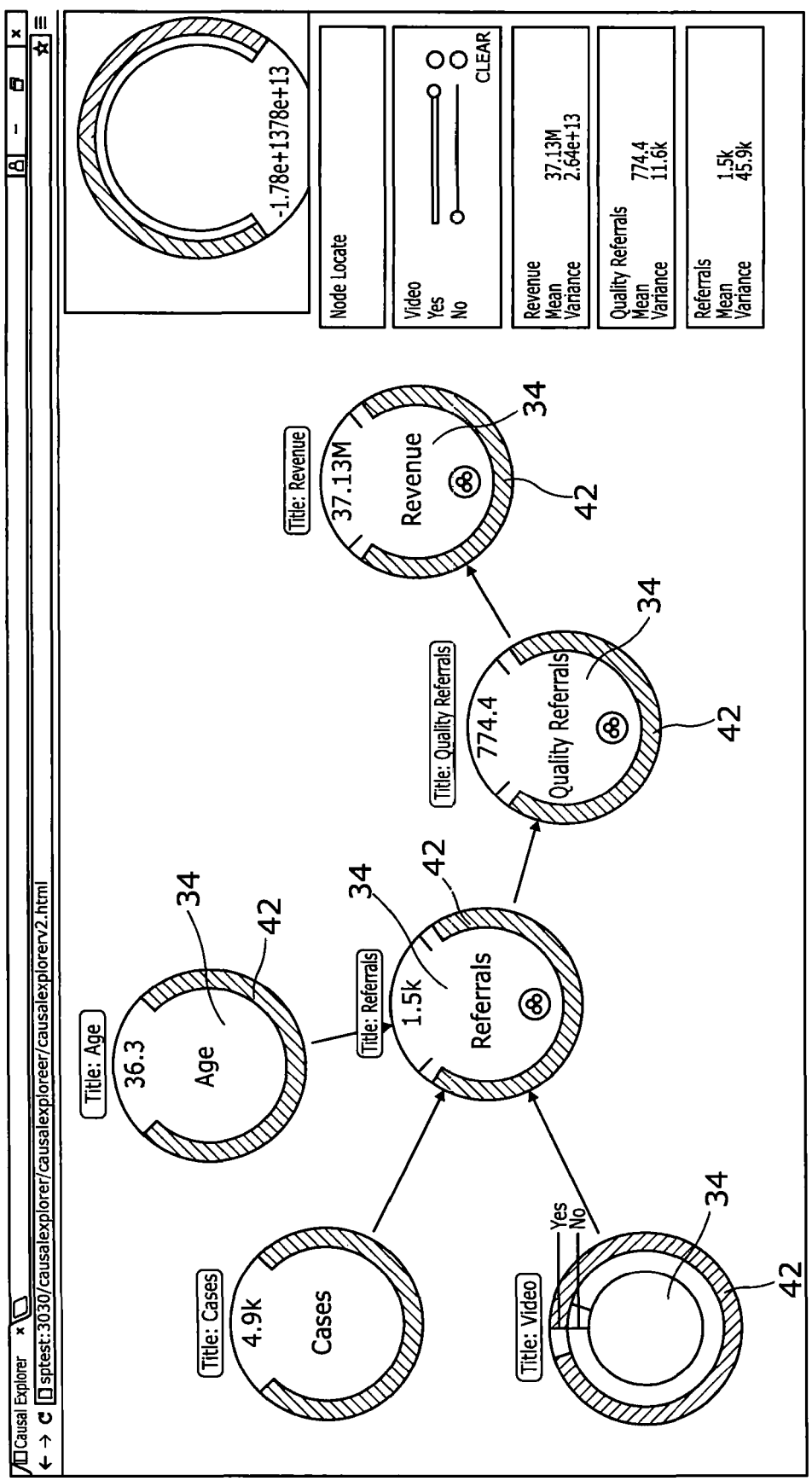

The second layer of the model then allows different outcomes to be predicted by implementing the real business operating model as a cause & effect network by including, for example the influence of customer demographic element. This could include the choosing of different branches to see if there are different outcomes, or, as shown in FIG. 16, to test under what scenario, if any, is an improvement in revenue achieved as the video service is rolled out and/or what could/should be done to move the outcomes in the right direction. The factors or components, and the status of the same with respect each change scenario is indicated in numbers and/or by a visual change in the annular rings 42 with respect to the elements 34.

There are many possible areas of use of the current invention. In another example of use, in the military environment, there There are again many requirements from the same model, such as the requirements of the Mission Commander, the Mission Analyst, and the Cyber Analyst:

The Mission Commander is responsible for the achievement of mission objectives, within the framework of military doctrine, and in collaboration with a number of other roles. The Mission Analyst is responsible for giving guidance to the Mission Commander on risk to the mission, and potential mitigations and the Cyber Analyst is responsible for identifying mitigations to identified adversary activity In relation to a cyber issue occurring then there can be several different aspects but all interlinked and referring to the same model of the military organisation. The elements which need to be addressed ensure that the influences are located within the context of particular elements of an associated business operating model; and are time-sensitive, in that a change of state in one property may have an effect on others at some point in the future (i.e. not necessarily instantaneous). In addition, the support for probabilities across continuous values (e.g. to predict the most likely quantity of supplies that will be at a base at a point in time) in addition to discrete states; the ability to bind nodes in the causal model directly to source data (i.e. to automatically feed source data and so give flexibility over the degree to which the 'human in the loop' is required); and the introduction of techniques from recent advances in Artificial Intelligence, including an extension to support the Monte-Carlo Tree Search (MCTS) method and associated machine learning algorithms, currently being implemented in the games industry all can be used to recommend the most likely events and the optimum mitigations to put in place in priority order for the most likely scenarios Thus, the model of the current invention allows many possible scenarios to be explored, each of which would take time to play out in real time, and each of which would be overtaken by events as soon as that scenario itself started to play out. These scenarios can all be performed in accordance with the model and the outcomes analysed with a great degree of confidence that the predicted outcome is accurate.

The current invention therefore provided an organisation wide model of interconnected concepts that drives mutual understanding and focuses the effort. With the appropriate concepts defined and agreed in the technology, it is possible for the user to see what is connected, and see what is starting to help clarify issues related to business outcomes, whether there is corresponding data or not and so there is provided a robust agreement and/or interpretation on what is important to manage in the business as a whole and independent of specific, single, data sources. The integration of the first, second and if required further layers allows the mapping of relevant data to the model elements of the first layer which is used as the prioritisation point for discovery and data quality, and is the automatically-generated target for the mapping of data which allows better data integration and highlights where better quality data may be required.

This therefore creates a dynamically-generated visualisation that utilises analytics to guide the answering of questions relevant to the organisation thereby providing more effective and faster confidence and agreement across the organisation of the outcomes. The provision of the causal links allows a network of cause/effect drivers across the model with quantified predictions of outcomes based on changes in any part of the organisation first layer.

The invention claimed is:

1. A method for dynamically generating and displaying a model of business projects to determine factors within elements and or sub-elements of an organization having a causal effect on the business projects and for determining a degree of influence for each factor in real time for making changes to the organization, said method comprising:
   displaying on a computer screen a plurality of business model projects and a plurality of features associated with the business model projects, each feature being represented by elements and one or more sub-elements stored in one or more databases, each element and sub-element having one or more attributes;
   providing data processing means to retrieve the business projects, elements, sub-elements, and attributes for display on the computer screen;

providing control means on the computer screen for:
   selecting at least one of the business model projects;
   creating a first real world layer of the at least one business model project with a number of the elements and/or sub-elements;
   selecting linkages between the elements and/or sub-elements in the first real world layer, the linkages representing relationships between the elements and/or sub-elements;
   selecting and querying the one or more attributes, including changing a value of at least one attribute;
   creating a second simulation possible outcomes layer having causal links and direct influence links being stored in the one or more databases, the direct influence links capable of being elements or sub-elements of the one or more further elements and having real-time displayable factors and having a causal link or effect on one or more of the displayable components, the second simulation possible outcomes layer further having a plurality of linked element nodes and the performance of the factors and/or components affects the plurality of linked element nodes;
   providing, for the selected elements and sub-elements, data processing means to store the attributes stored in the one or more databases;
   displaying the first real world layer and the selected linkages and the attributes of the at least one business model project;
   displaying a real-time degree of influence which one or more of the real-time displayable factors has on one or more of the elements, sub elements and/or attributes; and
   displaying alternative real-time scenarios of the at least one business project model by the user adjusting one or more elements, sub-elements, attributes, and linkages displayed to the user when viewing the first real world layer;
   inputting values for factors or components for exploring a degree of influence a factor or component has over an element, sub-element and/or attribute;
   displaying a condition of the elements and/or sub-elements in real time in the second simulation possible outcomes layer with respect to the selected values and;
   displaying a state, status or condition of all or selected elements or sub-elements as each would be in a future and/or past.

2. A method according to claim 1 wherein the relationship indicated by a link is a causal relationship.

3. A method according to claim 1 wherein said factors or components are displayed adjacent to, overlaid and/or superimposed on at least one of said elements and/or sub elements that contain the attribute and/or are linked to the same.

4. A method according to claim 3 wherein said factors or components are displayed on the second simulation possible outcomes layer of the model.

5. A method according to claim 1 wherein the method includes the steps of providing a visual display screen on which the visual displays of the first and second layers are generated, providing control means to allow user selection of elements from the visual displays and/or to make queries of the model, and data processing means to retrieve and process data to allow the model layers and the visual display to be adapted in response to the user query.

6. A method according to claim 3 wherein the degree of influence of one or more factors or components on elements, sub-elements and/or attributes of the same is represented by any, or any combination of circles, dials, bars, segments and/or the like.

7. A method according to claim 1 wherein the attributes include data and/or representations of said data that concerns the past and/or present performance of an element and/or sub-element.

8. A method according to claim 7 wherein the attribute data is stored in one or more databases and recalled from said databases in response to a user selection and/or query made via the model.

9. A method according to claim 2 wherein a plurality of factors or components have a causal effect on the same element, sub-element or attribute.

10. A method according to claim 1 wherein the at least second simulation possible outcomes layer includes representations of one or more factors or components that directly influence one or more further factors or components of said one or more further elements or sub elements connected by said causal links.

11. A method according to claim 1 wherein when selecting or moving from the first real world layer to the second simulation possible outcomes layer, at least part of the elements, sub elements and/or links shown in the visual display of the first layer are present in the visual display of the second simulation possible outcomes layer.

12. A method according to claim 11 wherein at least some of the elements, sub-elements and/or links from the first real world layer are visible along with factors or components which are included in the visual display of the second simulation possible outcomes layer.

13. A method according to claim 12 wherein the factors or components are displayed substantially within the element and/or sub-element displays in the second simulation possible outcomes layer.

14. A method according to claim 1 wherein the attributes are displayed in a separate window or region of the visual display.

15. A method according to claim 14 wherein the attributes which are displayed are dependent upon the user selection of an element and/or sub-element in the first real world layer.

16. A method according to claim 1 wherein the factors or components that have a causal influence on one or more further factors or components are of the same colour in the visual display which is generated.

17. A method according to claim 1 wherein the factors and/or components are shown as coloured rings or circles and/or segments thereof and the size of a segment is indicative of the probability of a factor or component being in a particular state and/or condition.

18. A system comprising a model for an organization and relating to a plurality of projects performed by the organization, each project having a plurality of features represented by elements and one or more sub-elements, said model including a first real world model layer and at least a second simulation possible outcomes model layer;
   said first real world model layer including one or more elements and one or more sub-elements whereby said elements and/or sub-elements are located within a database of said elements and/or sub-elements and are selectively connected by one or more links indicating a relationship between two or more of said elements and/or sub-elements, and at least one element and/or sub-element includes one or more attributes associated therewith said attributes retained and selectable from a database so as to be selectively associated, wherein the at least second simulation possible outcomes model layer includes said selected one or more elements and/or sub-elements connected by said one or more links and further includes links to one or more factors or components that influence one or more linked elements, sub-elements and/or attributes and wherein a degree of influence which a factor or component has on one or more elements, sub-elements and/or attributes is represented and/or quantified and amendment to adjust and/or insert a degree of influence that a factor or component has over elements, sub-elements and/or attributes is used to adapt the said second simulation possible outcomes model layer to reflect the organization at that time and/or specific user requirements of the model layer at that time;

user interaction means are provided to allow a user of the model to input values for factors or components to explore the degree of influence a factor or component has over an element, sub-element and/or attribute, the second simulation possible outcomes model layer further includes a plurality of linked element nodes and a performance of the factors and/or components affects the linked elements nodes and a condition of the elements and/or sub-elements are shown in real time in the second simulation possible outcomes model layer with respect to the selected user values;

and wherein the state, status or condition of all or selected elements or sub-elements as they would be in the future and/or past is displayed;

the system further comprising:

data processing means arranged to store on the database and retrieve from the database the business projects, elements, sub-elements, and attributes for display on a computer screen;

control means on the computer screen arranged for:
  selecting at least one of the business model projects;
  creating the first real world model layer of the at least one business model project with a number of the elements and/or sub-elements;
  selecting linkages between the elements and/or sub-elements in the first layer, the linkages representing relationships between the elements and/or sub-elements;
  selecting and querying the one or more attributes, including changing a value of at least one attribute;
  creating the at least second simulation possible outcomes model layer having causal links and direct influence links being stored in the database, the direct influence links being elements or sub-elements of the one or more further elements and having real-time displayable factors and having a causal link or effect on one or more of the displayable components; the second simulation possible outcomes model layer further including a plurality of linked element nodes and the performance of the factors and/or components affects the linked elements nodes and the condition of the elements and/or sub-elements are shown in real time in the second simulation possible outcomes model layer with respect to the selected user values;
  displaying the first real world layer and the selected linkages and the attributes of the at least one business model project;
  displaying a real-time degree of influence which one or more of the real-time displayable factors has on one or more of the elements, sub-elements and/or attributes; and
  displaying alternative real-time scenarios of the at least one business project model by the user adjusting one or more elements, sub-elements, attributes, and linkages displayed to the user when viewing the first real world model layer;
  inputting values for factors or components for exploring a degree of influence a factor or component has over an element, sub-element and/or attribute;
  displaying a condition of the elements and/or sub-elements in real time in the second simulation possible outcomes layer with respect to the selected values;
  displaying a state, status or condition of all or selected elements or sub-elements as each would be in a future and/or a past.

19. A system according to claim 18 wherein the attributes are populated with data or information concerning the current and/or previous conditions, states or statuses of the element and/or sub-element.

20. A system according to claim 18 wherein the relative performance of the factors and/or components is visualised or displayed to the user in at least the second simulation possible outcomes model layer.

* * * * *